United States Patent [19]

Sakurada et al.

[11] Patent Number: 4,863,680
[45] Date of Patent: Sep. 5, 1989

[54] FUEL ASSEMBLY

[75] Inventors: Koichi Sakurada, Narashino; Kouji Kiraiwa, Zushi; Yoshihira Ando; Yoshiro Kudo, both of Yokohama, all of Japan

[73] Assignee: Kabushiki Kaisha Toshiba, Kanagawa, Japan

[21] Appl. No.: 176,261

[22] Filed: Mar. 31, 1988

[30] Foreign Application Priority Data

| Apr. 2, 1987 | [JP] | Japan | 62-82124 |
| Jul. 27, 1987 | [JP] | Japan | 62-187295 |
| Jul. 27, 1987 | [JP] | Japan | 62-187296 |
| Jul. 27, 1987 | [JP] | Japan | 62-187297 |

[51] Int. Cl.$^4$ ............................................. G21C 3/32
[52] U.S. Cl. ....................................... 376/444; 376/438
[58] Field of Search ......................... 376/444, 434, 438

[56] References Cited

U.S. PATENT DOCUMENTS

| 3,808,098 | 4/1974 | Fredin | 376/444 |
| 4,229,258 | 10/1980 | Takeda | 376/444 |
| 4,526,746 | 7/1985 | Fredin | 376/444 |
| 4,652,426 | 3/1987 | Boyle | 376/444 |
| 4,683,113 | 7/1987 | Mochida | 376/419 |
| 4,777,016 | 10/1988 | Yosnioka | 376/444 |
| 4,781,885 | 11/1988 | Lill | 376/444 |

Primary Examiner—Donald P. Walsh
Attorney, Agent, or Firm—Finnegan, Henderson, Farabow, Garrett, & Dunner

[57] ABSTRACT

Disclosed is a fuel assembly comprises a plurality of cylindrical fuel rods with a plurality of fuel pellets sealed therein, a plurality of small units each having a predetermined number of the fuel rods bundled spaced with a fixed intercentral distance and being arranged in such a manner that the intercentral distance between the component fuel rods falling on the mutually juxtaposed sides of the adjacent small units is larger than the intercentral distance between the adjacent fuel rods in the small units, and at least one water rod near the center of a cluster of the plurality of the small units.

5 Claims, 32 Drawing Sheets

DURING OPERATION

DURING PERIOD OF COOLING

FUEL ASSEMBLY

The present application claims priority of Japanese Patent Application No. 62-82124 filed on Apr. 2, and No. 62-187295, No. 62-187296 and No. 62-187297 filed on July 27, 1987, respectively.

FIELD OF THE INVENTION AND RELATED ART STATEMENT

This invention relates to a fuel assembly for use in a light-water nuclear rector.

In recent years, the trend of light-water nuclear reactors toward increase in power generation capacity has been urging an exacting demand for improvement of the fuel cycle cost of power generation. Various improvements, therefore, have been given to fuel assemblies. Since an extension of fuel burnup is an effective approach to the improvement of the fuel cycle cost of power generation, the desirability of improving the fuel for the purpose of alleviating a possible effect of an elevated fuel burnup upon the core operation characteristic has been finding approval.

The fuel assembly heretofore used in the boiling-water reactor (BWR) is constructed by arranging cylindrical fuel rods each containing fuel pellets in a sealed state in the pattern of an 8-row 8-column tetragonal lattice within a channel box and disposing two water rods in the central part of the horizontal cross section of the interior of the channel box.

In the core of the BWR, the adjacent channel boxes are spaced with a water gap of a width approximately in the range of 10 to 20 mm and cruciform control rods are inserted therein. In the BWR, the light water which flows inside the channel boxes boiled and forms a two-phase flow containing an average of about 40% by volume of steam while the reactor is in operation. In contrast, the light water flowing through the water-gap region outside the channel boxes does not boil even while the reactor is in operation. Owing to the effect manifested in moderating neutrons by the light water present in the water-gap region, the thermal neutron flux distribution in the horizontal direction in the fuel assembly tends to increase towards the periphery and decrease towards the center. The fuel assembly, therefore, is provided near the center thereof with two water rods adapted to pass non-boiling water through the interior thereof. The water rods, owing to the effect manifested in moderating neutrons by the water passed therethrough, serve the role of enhancing the thermal neutron utilization factor of thermal by moderating the depress of the thermal neutron flux in the central part, diminishing the output peaking, and heightening the thermal neutron flux inside the bundle.

The effective multiplication factor of the core of a thermal reactor can be expressed with the four-factor formula as follows:

$$K_{eff} = \epsilon \times f \times p \times p_L$$

wherein
$K_{eff}$ = effective multiplication factor,
$\epsilon$ = fast fission factor,
$\eta$ = regeneration factor,
$f$ = thermal utilization factor.
$p$ = resonance escape probability, and
$p_L$ = ratio of neutrons leaking from core.

The water rods mentioned above are intended to increase the effective multiplication factor by heightening the thermal neutron utilization factor, f.

An effort to heighten the burnup for the purpose of improving the reduction of the fuel cycle cost, however, entails aggravation of the power mismatch among fuel assemblies and consequent rigidification of such thermal restrictions as the maximum linear power density and the minimum critical power ratio.

The feasibility of a fuel assembly using an increased number, 9 (row) × 9 (column), or fuel rods as a countermeasure is being considered. The increase in the number of fuel rods, however, entails a decrease in the outside diameter of component fuel rods an increase in the resonance escape probability and cancels the effect brought about in the enhancement of thermal utilization factor by the aforementioned incorporation of water rods.

For successful production of a fuel which permits extension of burnup and, at the same time, excels in economy, the enhance of thermal neutron utilization factor and the increase of resonance escape probability must be simultaneously satisfied.

The attainment of an extension of the burnup requires an increase of the initial concentration of fissionable isotopes (enrichment of uranium-235 and fissionable plutonium isotopes) in the fuel and, therefore, brings about various effects on the core characteristic of a reactor. In all the effects, the decrease of the subcriticality (shut down margin) during the period of cold state and the increase of the change of core reactivity (void reactivity coefficient and moderator temperature reactivity coefficient) due to the change in the density of moderator constitute the hardest problems from the standpoint of design. One possible way of overcoming these problems may reside in increasing the water-to-fuel. An increase in the volume of the light-water region, however, entails an addition to the core volume and an increase in the construction cost of the reactor. A decrease in the amount of fuel material results in an increase in the number of fuel assemblies to be replaced per cycle and a decline of the economy of fuel.

For successful production of a fuel assembly meeting the requirement for extension of burnup and excelling in core characteristic, therefore, it is further necessary to increase the shut down margin and lower the moderator density reactivity coefficient without entailing an increase in the volume of light water or a decrease in the amount of fuel material.

Some of the boiling-water reactor have a core of the construction called D-lattice core. In this core, wide gaps of large width permitting insertion of control rods and narrow gaps of small width not permitting insertion of any control rod are formed outside a channel box. The width of the wide gaps is roughly twice that of the narrow gaps.

In the D-lattice core, therefore, the power issues more readily from the wide gap side corners than from the narrow gap side corners. The power also issues more readily from the fuel rods facing on these gaps than from those not bordering on the gaps. Adjustment of the power, therefore, is accomplished by disposing a plurality of types of uranium rods differing in enrichment.

For the increase of the average enrichment in the fuel assembly of this nature, it is necessary not only to add water rods and gadolinia rods but also to increase the number of types of uranium rods differing in enrichment (hereinafter referred to as "split number"). The addition of gadolinia rods and the increase in the number of splits, however, are nothing desirable from the standpoint of lowering the fuel cycle cost.

OBJECT AND SUMMARY OF THE INVENTION

As object of this invention, therefore, is to provide a fuel assembly which excels in reduction of the fuel cycle cost because of an increased multiplication factor during the course of operation as compared with the conventional fuel assembly, possesses a shut down margin enough to meet the requirement for extension of burnup and permits an effective improvement of the moderator density reactivity coefficient, and ensures a generous thermal margin during the operation.

Another object of this invention is to provide a fuel assembly which minimizes the addition of gadolinia rods and obviates the necessity for increasing the number of splits in the improvement of the average enrichment of fuel assembly and, as compared with the conventional fuel assembly of equal average degree of concentration and equal water-to-fuel volumetric ratio, exhibits a high reactivity during the output operation, a small local power peaking, and a small difference of reactivity during the power operation and during the period of cold state.

To be specific, the fuel assembly of this invention is constructed by preparing small units each having a small number of fuel rods bundled as spaced with a fixed intercentral distance, arranging a plurality of such small units in such a manner that the intercentral distance between the component fuel rods forming mutually juxtaposed sides of the adjacent small units is larger than the intercentral distance between the adjacent fuel rods within the small units, and disposing a water rod near the center of a cluster of the plurality of small units. Owing to this construction, the fuel assembly enjoys outstanding fuel economy, ensures an ample shut down margin even when the fuel to be used has a high enrichment, and permits a decrease in the moderator density reactivity coefficient.

BRIEF DESCRIPTION OF THE DRAWINGS

FIG. 16 is a schematic cross section illustrating a typical fuel assembly as yet another embodiment of this invention;

DETAILED DESCRIPTION OF PREFERRED EMBODIMENTS

Now, the embodiment of the present invention will be described below with reference to the accompanying drawings.

Figure 1:
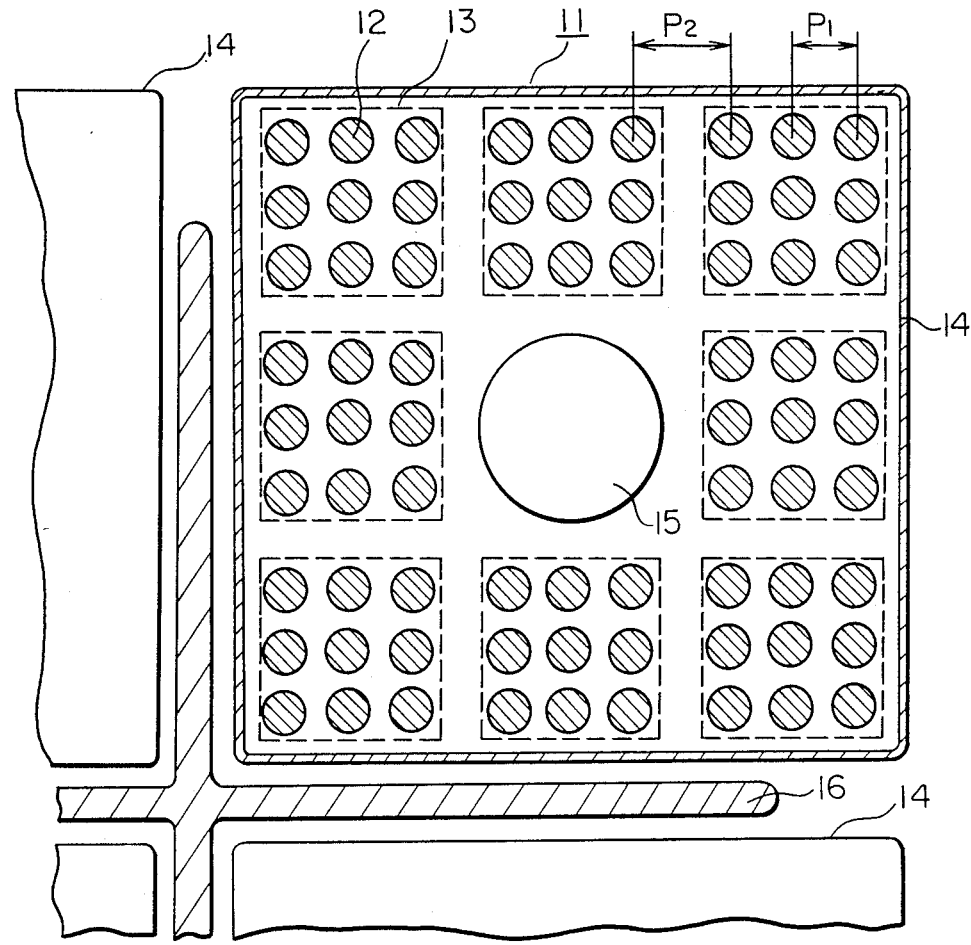
FIG. 1 is a schematic cross section illustrating a typical fuel assembly as one embodiment of the present invention.

FIG. 1 illustrates a typical fuel assembly as one embodiment of the present invention. In a fuel assembly 11 of this embodiment, small units 13 are formed each by arranging fuel rods 12 in a square matrix of 3 rows and 3 columns. A total of eight such small units 13 are contained in a channel box 14 of a square cross section. In the central part of the channel box 14, a water rod 15 having an outside diameter equaling one side of the square of the small unit 13 is disposed.

The intercentral distance $P_2$ between two juxtaposed fuel rods 12 belonging one each to two adjacent small units 13 is so larger than the intercentral distance $P_1$ between two juxtaposed fuel rods 12 belonging to one and the same small unit 13 as to satisfy the relation, $P_2 = 1.5 \times P_1$ for example. The outer diameter of the fuel rod 12 is about 11 mm, for example and the inside diameter of the water rod 15 is about 42 mm.

A multiplicity of such fuel assemblies 11 of the construction of the present embodiment described above are arranged in a boiling-water reactor. In the water gap regions intervening between adjacent channel boxes 14, light water which is not boiling is passed. In the water gap regions, a cruciform control rod 16 is inserted.

Figure 2:
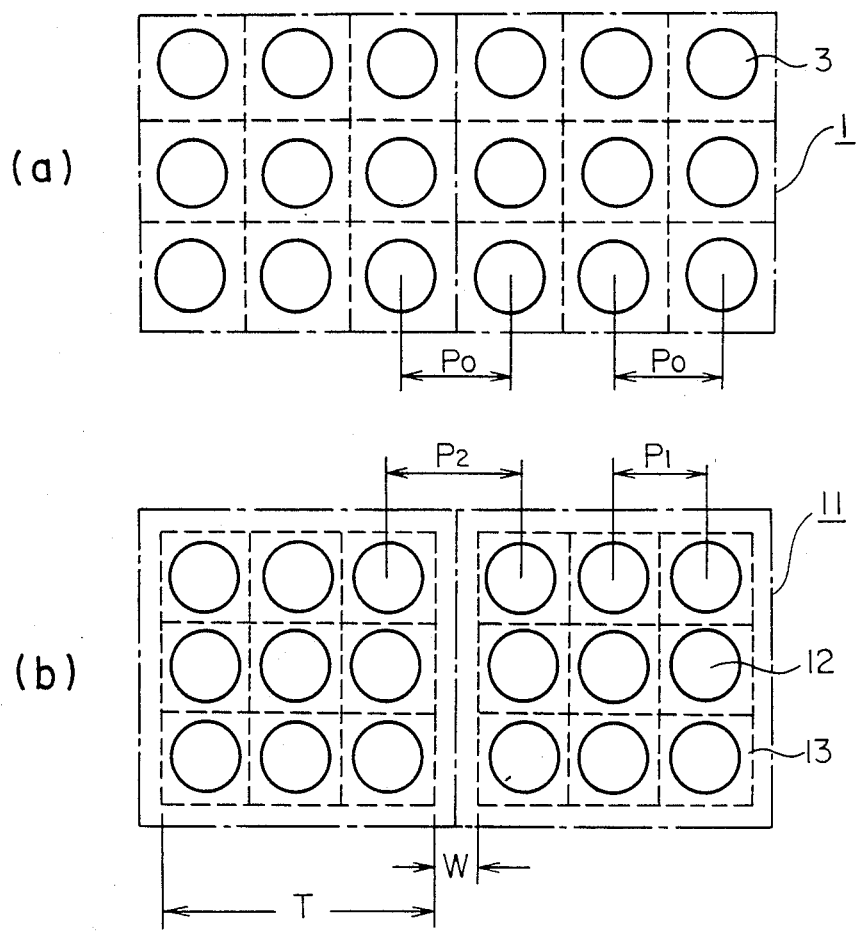
FIG. 2a and FIG. 2b are magnified schematic cross sections respectively of a conventional fuel assembly and the fuel assembly of FIG. 1.

FIG. 2 compares the fuel assembly 11 of the present embodiment with a conventional fuel assembly. As illustrated in FIG. 2 (a), the conventional fuel assembly has all the fuel rods 3 arranged as spaced by a fixed distance $P_0$. In the fuel assembly 11, the aforementioned intercentral distance $P_1$ is smaller than $P_0$ and the aforementioned intercentral distance $P_2$ is larger than $P_0$.

Thus, in the fuel assembly 11, the resonance escape probability is larger than in the conventional fuel assembly 1 because the mutual effect of the fuel rods 12 in shielding the resonance energy neutrons is larger in the former than the latter. Then, the thermal neutron utilization factor is smaller in the fuel assembly 11 than in the fuel assembly 1 because the thermal neutron flux is high along the boundary between the adjacent small units 13 and low within the small units 13. This decrease in the thermal neutron utilization factor increases in proportion as the ratio between the width of an internal gap to be formed between the adjacent small units 13, namely the distance W indicated in FIG. 2 (b), to the distance of diffusion of thermal neutrons increases. The diffusion length of thermal neutrons increases with the decreasing density of water and decreases with the increasing density of water. The decrease of the aforementioned thermal neutron utilization factor is small during the course of operation and large during the period of cold state. The increase of the resonance escape probability is larger during the course of operation than during the period of cold state because the mutual shielding effect increases in proportion as the density of water decreases.

Owing to the effects described above, the ratio increase in the resonance escape probability is amply larger than the decrease in the thermal neutron utilization factor during the course of operation and the decrease in the thermal neutron utilization factor in larger than the ratio of the increase in the resonance escape probability during the period of cold state where small units 13 of the scale of 3 rows and 3 columns to 5 rows and 5 columns are used in the boiling-water reactor, for example.

Figure 3:
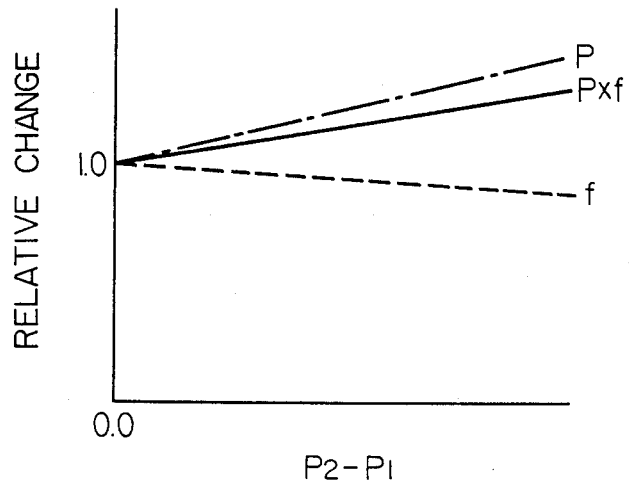
FIG. 3 is a graph showing the relation between the difference of $P_2$ and $P_1$ during the operation of a nuclear reactor and the resonance escape probability, the thermal neutron utilization factor, and the products thereof.
Figure 4:
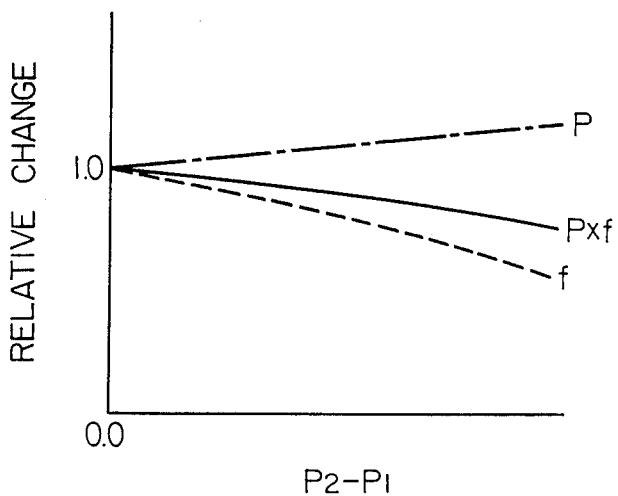
FIG. 4 is a graph showing the relation between the difference of $P_2$ and $P_1$ during the period of cold state and the resonance escape probability, the thermal neutron utilization factor, and the products thereof.

The graphs of FIG. 3 and FIG. 4 show relative changes of resonance escape probability p, thermal neutron utilization factor f, and the product thereof p×f, respectively during the course of operation and during the period of cold state, with the horizontal axis taken as the scale of the difference between $P_2$ and $P_1$.

Since the density of water is small and the diffusion length of thermal neutrons is large during the course of operation, the thermal neutron utilization factor f declines slightly as indicated by the dotted line in FIG. 3 as the difference between $P_2$ and $P_1$ widens. During the period of cold state, since the density of water is large and the diffusion length of thermal neutrons is small, the thermal utilization factor f sharply decreases as indicated by the dotted line in FIG. 4 as compared with the change registered during the course of operation.

In contrast, as indicated by the alternate one long one short dash line in FIG. 3 and FIG. 4, the resonance escape probability p increases with the widening difference between $P_2$ and $P_1$ both during the course of operation and during the period of cold state. The fact remains, however, that the probability of the resonance energy neutrons being moderated by water during their travel between the fuel rods increases with the increasing density of water. The change in the resonance escape probability, therefore, is slightly smaller during the period of cold state than during the course of operation because the mutual shielding effect manifested on the resonance energy neutrons by the fuel rods decreases in proportion as the density of water increases.

The effective multiplication factor of the core is directly proportional to the produce of p×f as described above. Further, as indicated by the solid line in FIG. 3, the product of p×f increases with the widening difference between $P_2$ and $P_1$ during the course of operation. It follows that the effective multiplication factor can be increased by widening the difference between $P_2$ and $P_1$. If the difference between $P_2$ and $P_1$ is increased beyond the range shown in FIG. 3, however, the decrease of f increases and the effective multiplication factor begins to decline even during the course of operation.

It is indicated by the solid line in FIG. 4 that the product of p×f is decreased by widening the difference between $P_2$ and $P_1$ during the period of cold state as observed with respect to the difference between $P_2$ and $P_1$ during the course of operation. This means that the effective multiplication factor decreases with the widening difference between $P_2$ and $P_1$.

Unlike the conventional fuel assembly 1 which has all the fuel rods 3 arranged as spaced with a fixed distance, therefore, the fuel assembly 11 of the present embodiment enables the economy to be improved by heightening the effective multiplication factor of the core during the course of operation and the shut down margin to be increased by lowering the effective multiplication factor during the period of cold state.

In the light-water reactor using cruciform control rods, water gap regions having a width approximately in the range of 10 to 20 mm are formed outside channel boxes. As a result, the thermal neutron flux distribution in the horizontal direction increases towards the periphery of the fuel assembly 11 and decreases towards the center thereof. The thermal neutron utilization factor can be further improved and the economy enhanced by flattering this thermal neutron flux distribution. To meet the requirement for extension of burnup, efforts must be paid also to the improvement in this respect.

The present embodiment contemplates disposing in the central part of the fuel assembly the water rod 15 having a large diameter equaling one side of the square matrix of 3 rows and 3 columns of fuel rods 12 as illustrated in FIG. 1. In addition to the water inside the water rod 15, the region of water surrounding the water rod 15 is increased by the small units 13. Owing to the water rod 15 and the region of water intervening between the water rod 15 and the small units 13, the thermal neutron flux is heightened in the central part of the fuel assembly 11 so much as to flatten the thermal neutron flux distribution. As a result, the fuel assembly of the present embodiment enjoys a large thermal neutron utilization factor and excels in economy as compared with the conventional fuel assembly.

Figure 5:
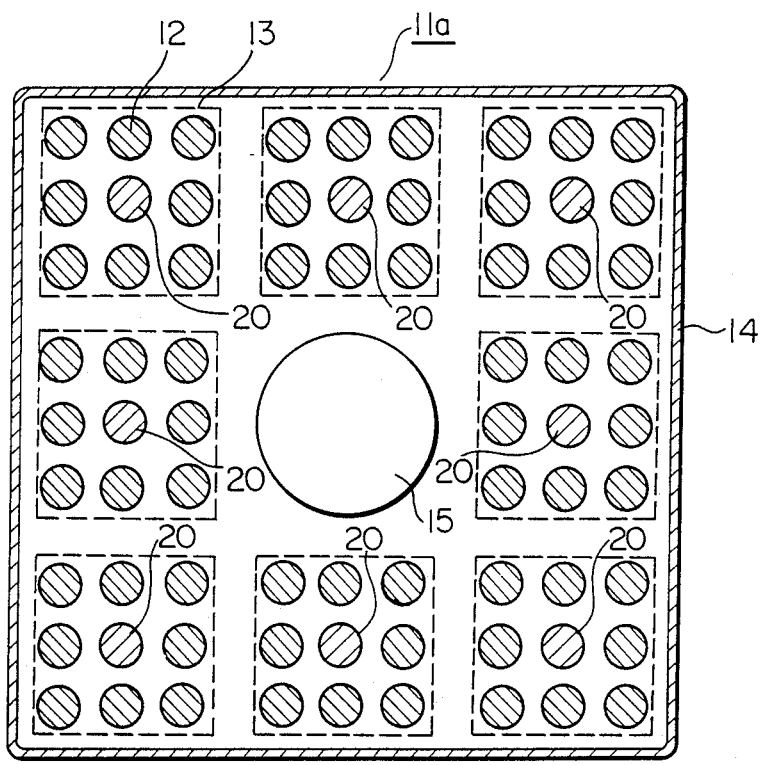
FIG. 5 is a schematic cross section illustrating at typical fuel assembly as another embodiment of this invention.
Figure 6:
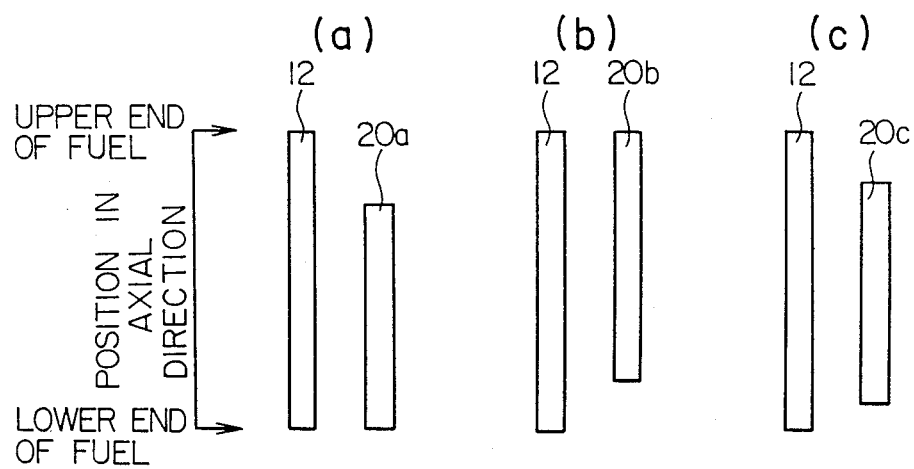
FIG. 6 is a schematic side view illustrating partial length fuel rods.

In the fuel assembly 11 described above, the coolant flow path surrounding the fuel rod located at the center of each of the small units 13 is narrow as compared with that surrounding any of the other fuel rods 12 of the same small unit. There is, therefore, the possibility that the thermal restriction imposed upon the fuel rod 12 located at the center of the small unit 13 will be rigidified. To the problem of this nature, a fuel assembly 11a illustrated in FIG. 5 proves to offer an effective solution. In this fuel assembly 11a, the fuel rod 12 at the center of each of the small units 13 is replaced with a fuel rod 20 having a partial length in the direction of axis thereof. This fuel rod 20 may be in the form of a partial length fuel rod 20a having a shortened upper portion, a partial length fuel rod 20b having a shortened lower portion, or a partial length fuel rod 20c having shortened upper and lower portions as illustrated in FIG. 6. The adoption of the partial length fuel rods 20b or the partial length fuel rods 20c in the present embodiment can be realized by the method of retaining fuel rods by means of a spacer which has already found adoption in the existing PWR's. This spacer (consisting of several vertically separated component members) is capable of retaining all the fuel rods contained in a total of eight small units. Otherwise, separate spacers may be used one each for the small units.

Figure 7:
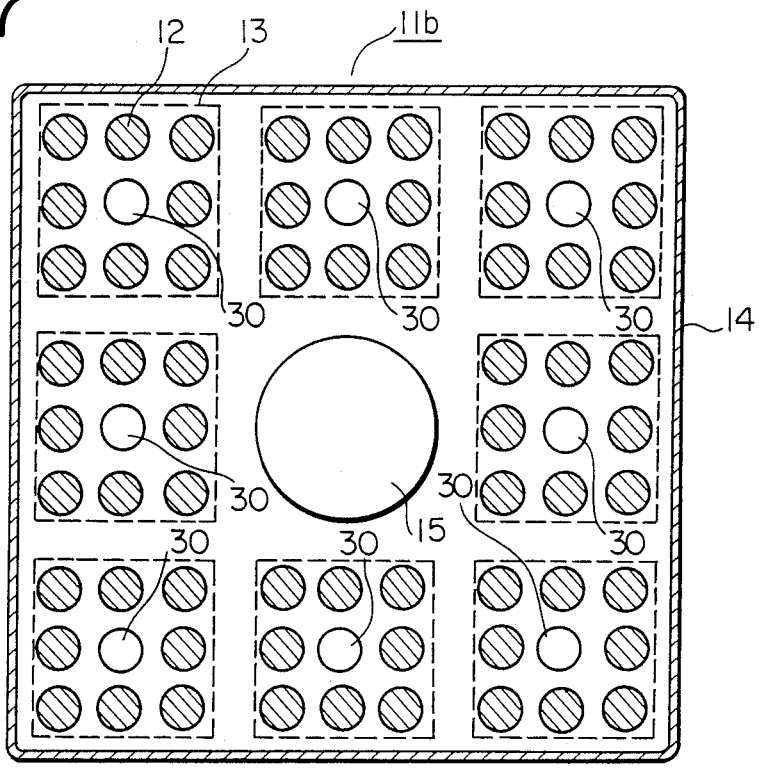
FIGS. 7 to 16 are schematic cross sections of typical fuel assemblies as other embodiments of this invention.
Figure 8:
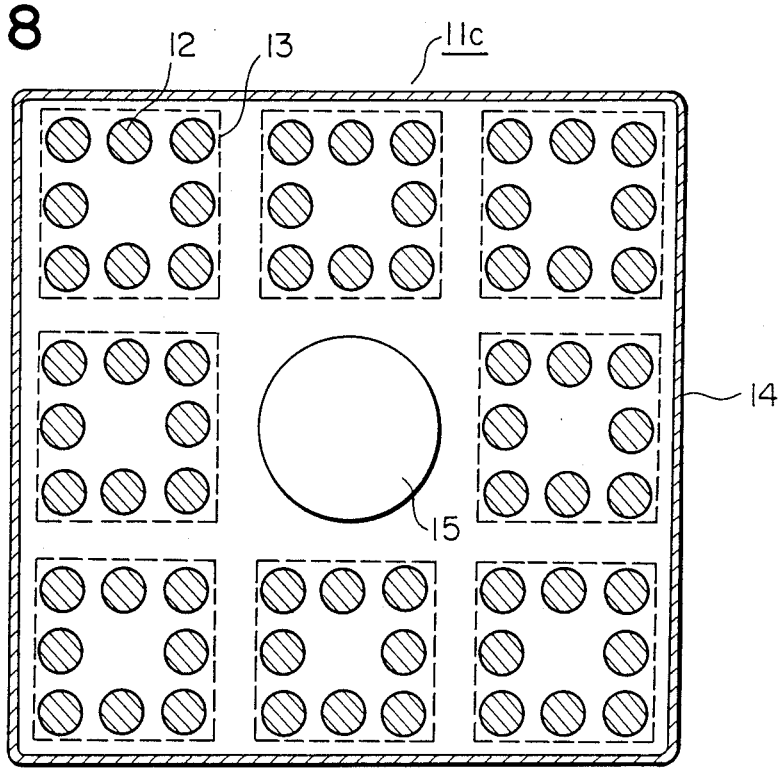

The problem that the thermal restriction imposed on the fuel rod located at the center of each of the small unit 13 may be otherwise coped with effectively by using fuel rods smaller in diameter than the other fuel rods 12 in the place of the aforementioned partial length fuel rods 20. Alternatively, this problem may be solved by using water rods 30 in the place of all or some of the central fuel rods 12 in the small units 13 as in a fuel assembly 11b illustrated in FIG. 7, by omitting the insertion of the central fuel rods 12 of the small units 13 as in a fuel assembly 11c illustrated in FIG. 8, or using fuel members containing such burnable poisons as gadolinium oxide ($Gd_2O_3$) in the place of all or some of the central fuel rods 12 of the small units 13.

Figure 9:
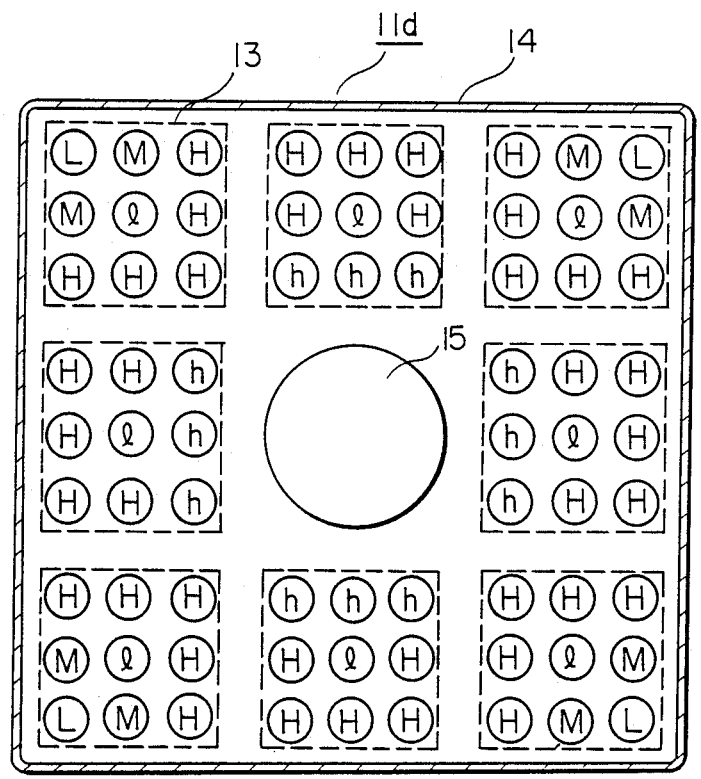

Incidentally, in the fuel assembly 11 illustrated in FIG. 1, the thermal neutron flux increases towards the periphery of each of the small units 13 and decreases towards the center thereof. It is, therefore, proper as in the case of a fuel assembly 11d illustrated in FIG. 9, to heighten relatively the enrichment of the peripheral fuel rods 12 of the small units 13 for the purpose of extending the burnup and lower the enrichment of the central fuel rods 12 of the small units for the purpose of alleviating the thermal restriction. In FIG. 9, the symbols h, H, M, L, and l denote fuel rods using a fissile substance in enrichment sequentially decreased in the order mentioned. The difference of enrichment between the fuel rods denoted by the symbols h and H and that between the fuel rods denoted by the symbols L and l are smaller than that between the other fuel rods.

Figure 10:
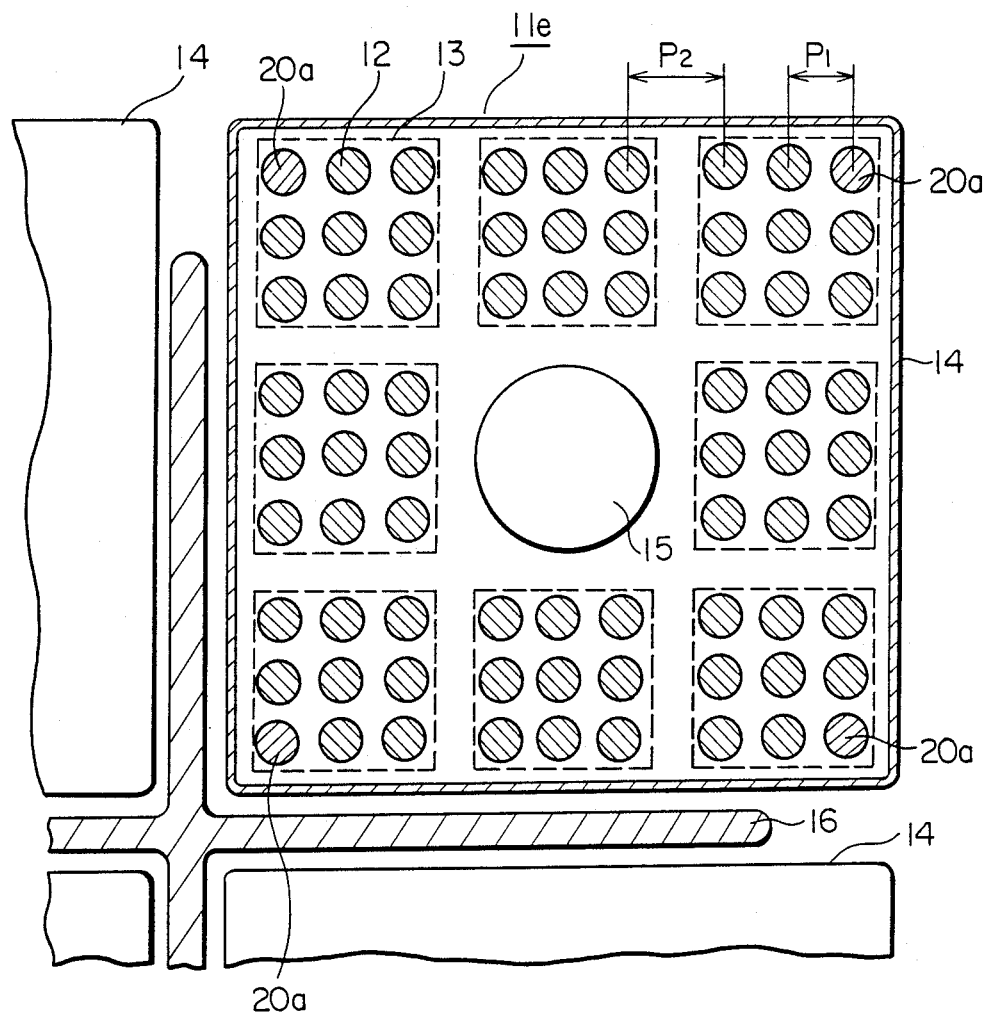

Then, in a fuel assembly illustrated in FIG. 10, partial length fuel rods 20a having a shortened upper portion are used as fuel rods to be positioned one each at the four corners of the assembly. This modification aims to preclude the possibility that the flux of the coolant (flow volume per unit area) will be smaller in the subchannels (sub-flow paths for the coolant) near the corners of the fuel assembly than the average flux in the overall flow path of the fuel assembly and the critical heat flux or the critical power ratio, one of the magnitudes of thermal restriction imposed on the light-water reactor, will be lowered in the subchannels near the corners.

To be specific, the disposition of such partial length fuel rods 20a at the corners of the fuel assembly brings about the following effect upon the critical heat flux (critical power).

Firstly, the pressure loss in the subchannels surrounding the partial length fuel rods 20a is decreased and the flux of the coolant in the subchannels is consequently increased and the critical heat flux (critical power) is proportionately increased. Particularly in the boiling-water reactor, the use of partial length fuel rods 20a having a shortened upper portion is effective because the void ratio is large in the upper part (downstream side) of the core and the two-phase flow pressure loss coefficient is consequently large in the upper part of the core.

Secondly, in the boiling-water reactor, the critical heat flux is lowered in the upper part of the core because the void ratio is increased in the upper part (downstream side) of the core. Thus, the critical power can be increased by disposing the partial length fuel rods 20a having a shortened upper part as closely juxtaposed to the subchannels of lower critical heat flux thereby alleviating the thermal load upon the subchannels in the upper part of the core.

The question as to which subchannels are subject to the most rigorous critical heat flux (critical power) depends, to be exact, upon the pitch of separation of the fuel rods, the distance between the surface of the outermost fuel rods 12 and the surface of the channel box 14, for example. When the fuel assembly constructed as illustrated in FIG. 10 is considered with respect to the sizes of the BWR fuel assemblies, it is most effective to use the partial length fuel rods 20a at the corners or at the (2, 2) positions from the corders. The replacement of at least one of the four corners or near-corner fuel rods with the partial length fuel rod 20 is also effective in improving the critical heat flux (critical power).

In this case, it is advantageous to use as the partial length fuel rod 20 the aforementioned partial length fuel rod 20a having a shortened upper portion as compared with the whole length fuel rod 12. The use of the aforementioned partial length fuel rod 20b having a shortened lower portion, however, proves to be effective in decreasing the pressure loss and increasing the flux in the surrounding subchannels. Likewise, the use of the aforementioned partial length fuel rod 20c having shortened upper and lower portion is effective in improving the critical heat flux or the critical power.

In the case of the aforementioned partial length fuel rod 20b and partial length fuel rod 20c, the fuel assembly is constructed so as to retain these partial length fuel rods by means of an upper tie plate or a spacer. Since these partial length fuel rods 20b and partial length fuel rods 20c are not required to be supported by the lower tie plate, the pressure loss in the portions of the lower tie plate directly below the partial length fuel rods can be decreased. By this effect, the critical heat flux or the critical power can be proportionately improved. The length of the partial length fuel rods is desired to be in the range of $\frac{1}{2}$ to $\frac{7}{8}$ of the length of the whole length fuel rods.

Figure 11:
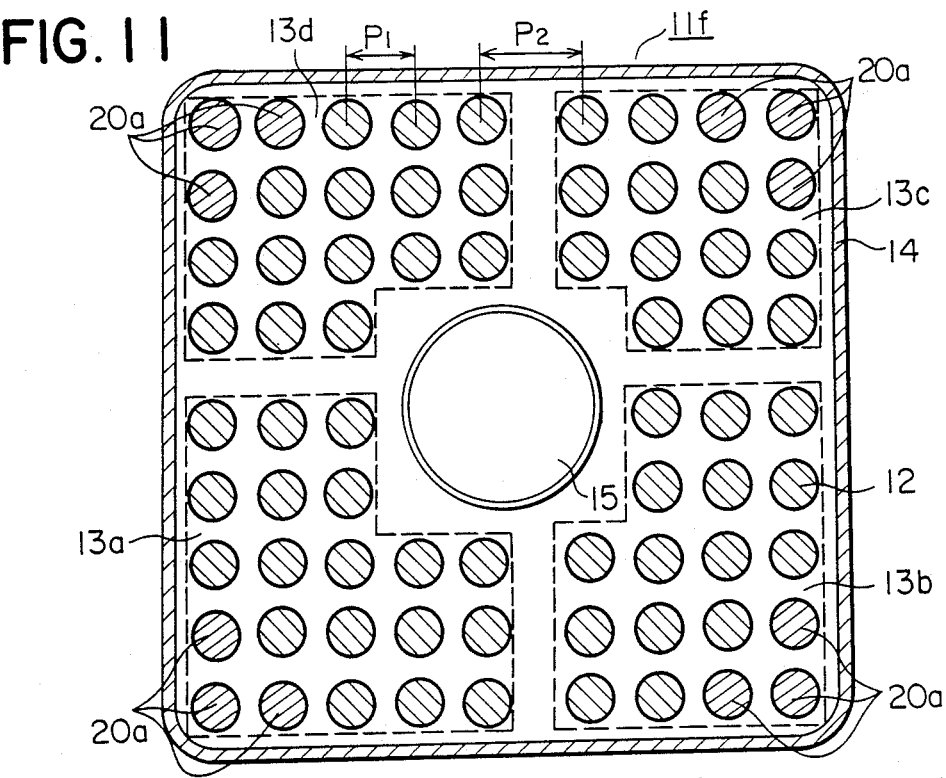
Figure 12:
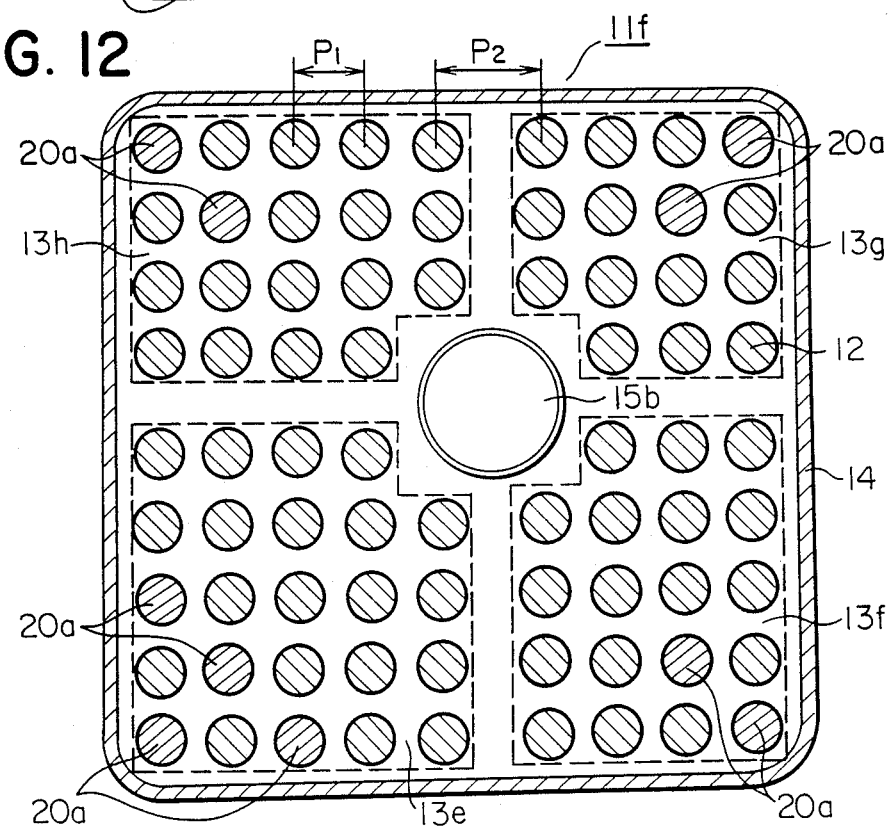

A fuel assembly 11f illustrated in FIG. 11 represents an embodiment wherein four small units 13a, 13b, 13c, and 13d formed by enlarging the small units 13 of the fuel assembly 11e illustrated in FIG. 10 so as to acquire mutually different shapes are arranged. In this fuel assembly, partial length fuel rods 20a are disposed one each at three positions near each of the corners of the fuel assembly. A fuel assembly 11g illustrated in FIG. 12 has a construction wherein four small units 13e, 13f, 13g, and 13h of mutually different shapes are arranged and a water rod 15b having a diameter equalling one side of a square containing four fuel rods 12 is disposed approximately at the center of the fuel assembly. In this fuel assembly, four partial length fuel rods 20a are disposed in the small unit 13e of the largest size and two partial length fuel rods 20a are disposed in each of the other small units 13f, 13g, and 13h.

The embodiments have been described each as forming a fuel assembly composed of 9 rows and 9 columns of fuel rods. They do not prevent the present invention from being embodied in fuel assemblies of other constructions.

Figure 13:
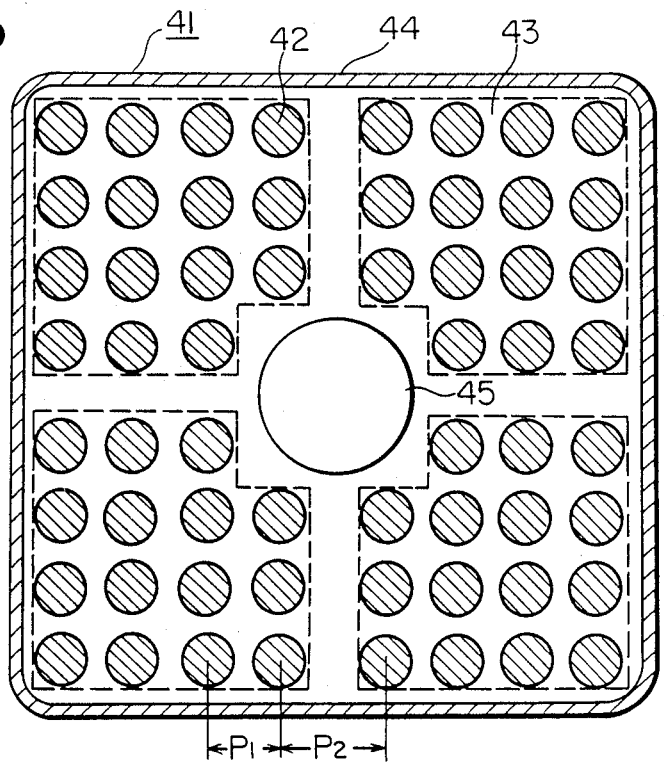
Figure 14:
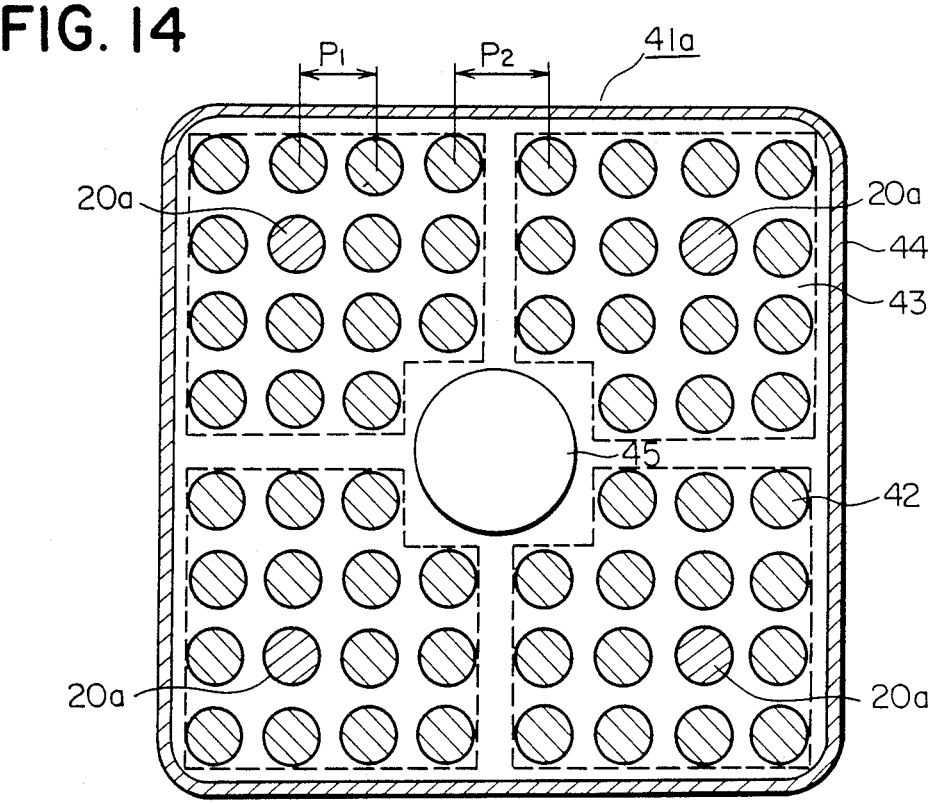

A fuel assembly 41 illustrated in FIG. 13 is composed of 8 rows and 8 columns of fuel rods 42. Within a channel box 44 having a square cross section, four small units 42 each formed of 4 rows and 4 columns (minus one fuel rod) of fuel rods 42 are arranged and a water rod 45 is disposed at the center of the fuel assembly. In this embodiment, similarly to the embodiments described above, the intercentral distance $P_2$ is larger than the intercentral distance $P_1$ A fuel assemble 41a illustrated in FIG. 14 represents an embodiment wherein partial length fuel rods 20a are disposed one each in one inner row and one inner column relative to the four corners of the fuel assembly 41.

Figure 15:
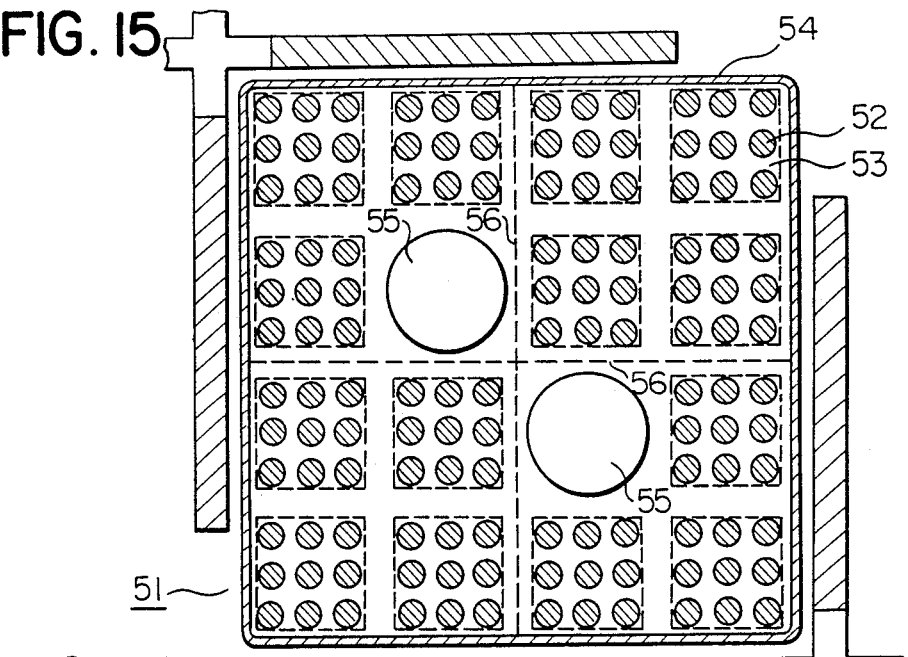

A fuel assembly 51 illustrated in FIG. 15 represents an embodiment of the present invention in a BWR fuel assembly having a larger size than the conventional countertype. In this fuel assembly 51, 14 small units 53 each composed of 3 rows and 3 columns of fuel rods 52 are disposed inside a channel box 54 and two water rods 55 are disposed approximately at the center. In the case of this fuel assembly 51, since the channel box 54 uses side walls of a large length, richly perforated structural members 56 disposed to interconnect the opposed side walls bring about a notable effect in diminishing possible bulging of the channel box 54. These structural members 56 need not be installed throughout the entire axial length of the channel box but may be disposed as separated into several pieces over part of the axial direction. To decrease the amount of neutrons to be absorbed by the structural members 56, the structural members 56 are desired to possess a large number of through holes.

Figure 16:
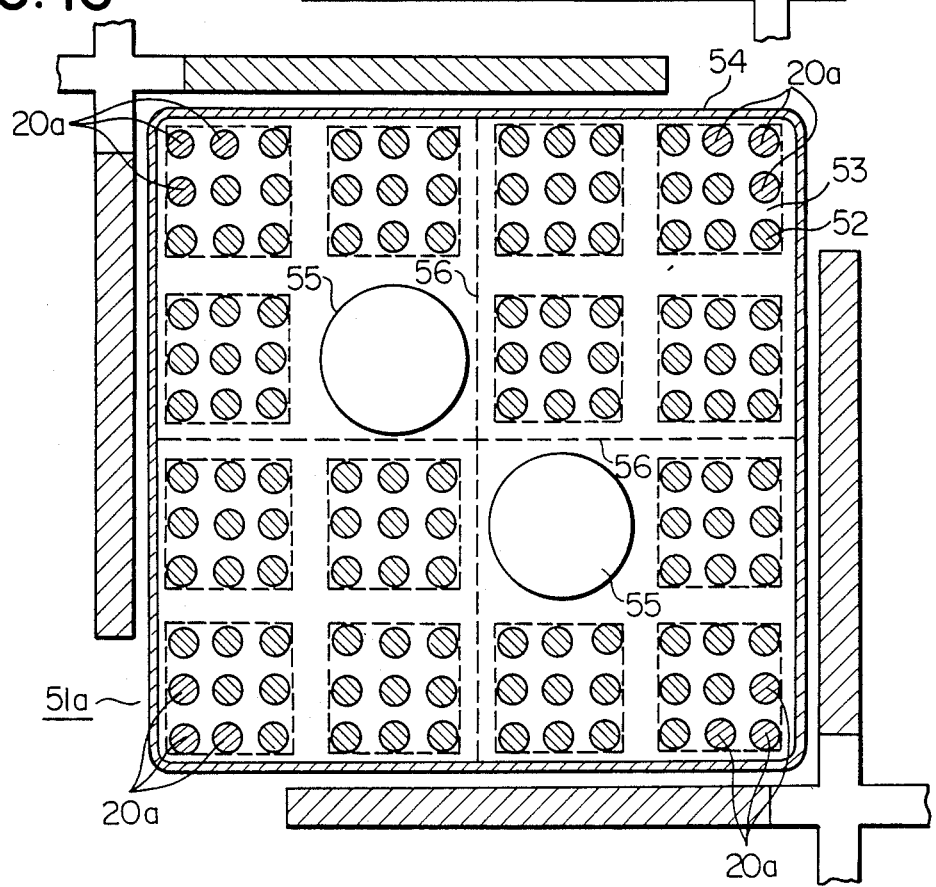

A fuel assembly 51a illustrated in FIG. 16 represents an embodiment wherein three partial length fuel rods 20a are disposed at each of the four corners of the fuel assembly 51.

Now, a fuel assembly so constructed that the distance (width of internal gap) between the adjacent small units 13 is varied within the fuel assembly will be described.

Figure 17:
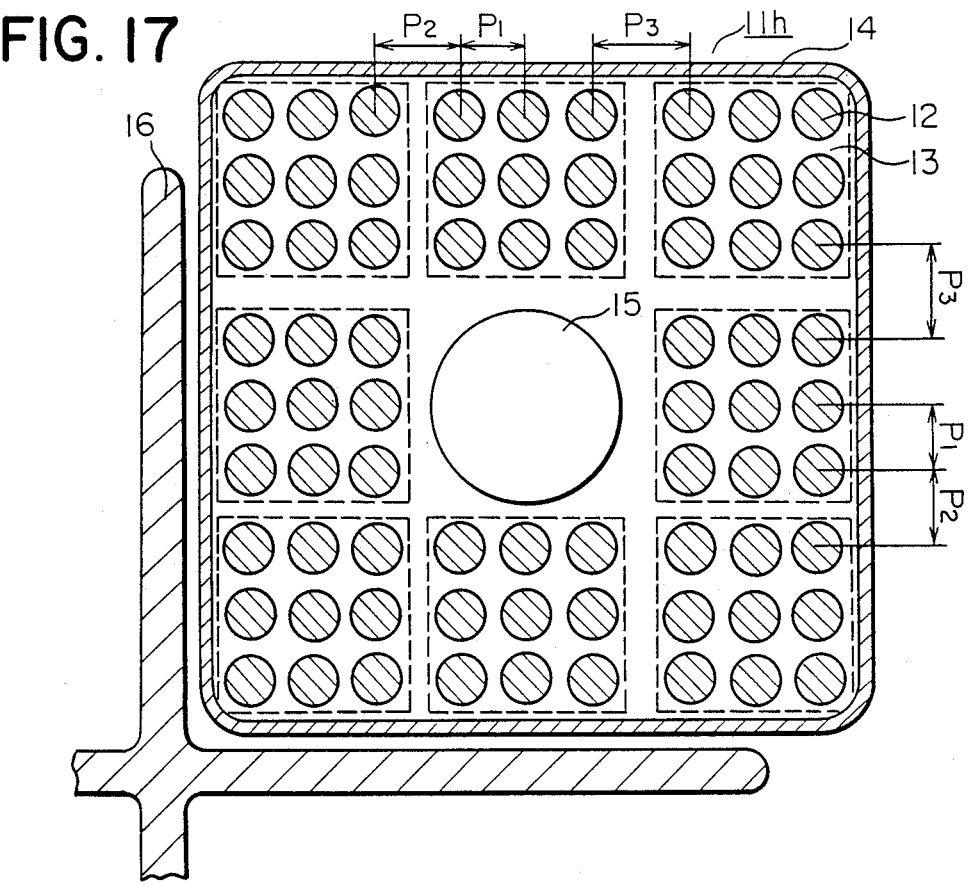
Figure 18:
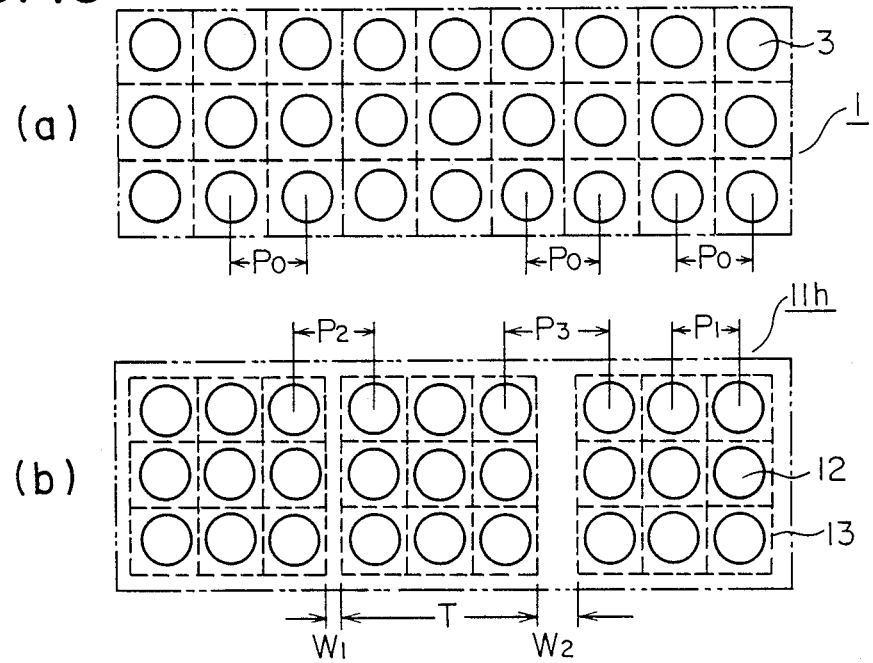
FIG. 18a and FIG. 18b are magnified schematic cross sections respectively of a conventional fuel assembly and the fuel assembly of FIG. 17.

A fuel assembly 11h illustrated in FIG. 17 represents an embodiment wherein the intercentral distances $P_2$ and $P_3$ between two juxtaposed fuel rods 12 belonging one each to two adjacent small units 13 are so larger than the intercentral distance $P_1$ between two juxtaposed fuel rods 12 belonging to one and the same small unit 13 as to satisfy the relation, $P_3 = 1.7 \times P_1$ and $P_2 = 1.3\ P_1$, for example. FIG. 18 compares this fuel assembly 11h and the conventional fuel assembly 1. Unlike the conventional fuel assembly 1 having all the fuel rods 3 disposed as spaced with a fixed intercentral distance $P_0$ as illustrated in FIG. 18 (a), this fuel assembly 11h has the fuel rods so spaced that the intercentral distances $P_2$ and $P_3$ are larger than the distance $P_0$ and the intercentral distance $P_1$ is smaller than $P_0$.

In the fuel assembly 11h of such a construction as described above, the ratio of the decline of the thermal neutron utilization factor increases in proportion as the distance between the adjacent small units 13, namely the ratio of the widths $W_1$, $W_2$ of the internal gaps illustrated in FIG. 18 (b) to the distance of diffusion of thermal neutrons, increases.

Figure 19:
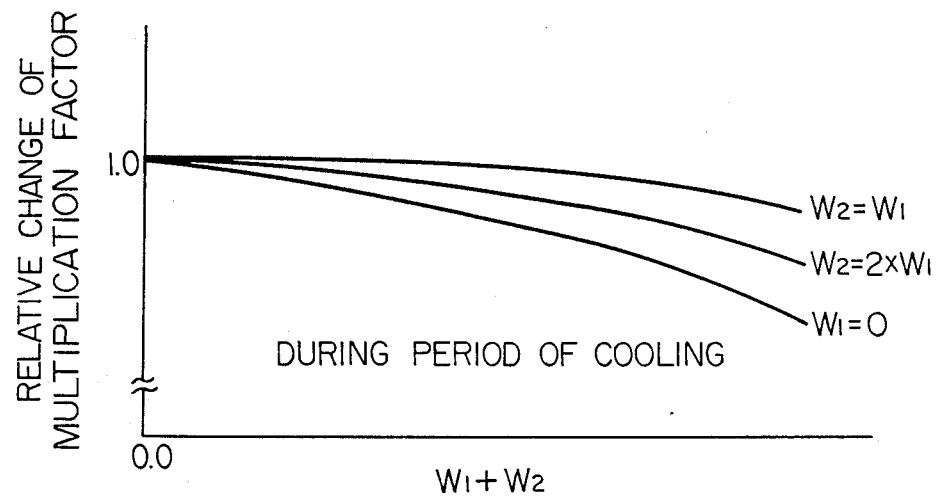
FIG. 19 is a graph showing the relation between the sum of $W_1 + W_2$ and the multiplication factor, as the function of the ratio of $W_2$ and $W_1$ during the period of cold state.

The graph of FIG. 19 shows the relative change of the multiplication factor with the sum of $W_1 + W_2$ during the period of cold state, with the ratio of $W_2$ to $W_1$ as a parameter.

The decrease of the thermal neutron utilization factor exponentially varies relative to the ratio of the distance between the adjacent small units 13 (widths $W_1$ and $W_2$ of the internal gaps) to diffusion length of thermal neutrons in the pertinent region. Even when the sum of $W_1$-$W_2$ is fixed, therefore, the proportion of the decrease in the multiplication factor varies with the varying ratio of the widths $W_2$ and $W_1$ To be specific, the proportion of the decrease of the multiplication is small where the two widths $W_2$ and $W_1$ are equal and large where the ratio of the widths, $W_2$ to $W_1$, increases.

Figure 20:
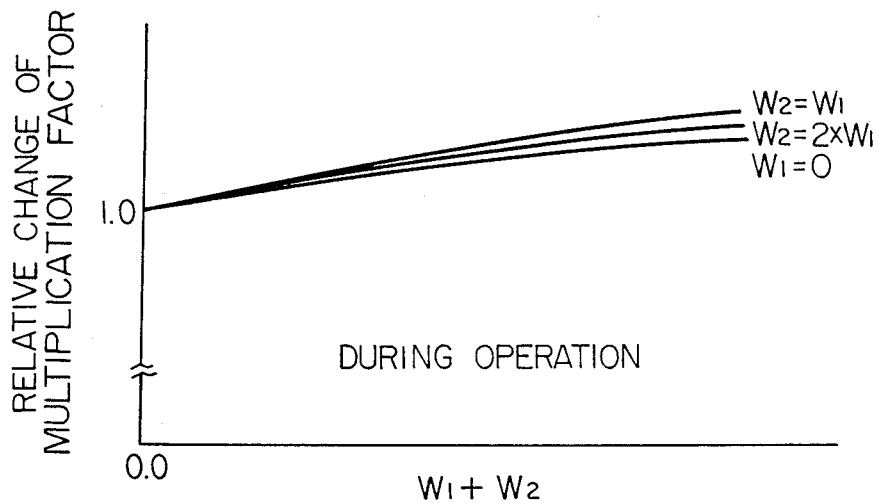
FIG. 20 is a graph showing the relation between the sum of $W_1 + W_2$ and the multiplication factor, as the function of the ratio of $W_2$ and $W_1$ during the course of the operation.

The graph of FIG. 20 show the same relation as in the graph of FIG. 19, obtained during the course of operation. During the course of operation, since the proportion of the decrease of the thermal neutron utilization factor is fairly small as compared to that during the period of cold state, the change of the multiplication factor due to the change of the ratio of $W_2$ to $W_1$ is small. Similarly to the behavior during the period of cold state, however, the multiplication factor decreases, though slightly, in proportion as the ratio of $W_2$ to $W_1$ increases.

From the standpoint of improving the shut down margin, therefore, the effect in this improvement increases in proportion as the ratio of $W_2$ to $W_1$ increases. To be specific, the shut down margin is enhanced when the width, $W_2$ ($P_3$), is increased on condition of $W_1 = 0(P_2 = P_1)$. The multiplication factor during the course of operation, however, decreases though slightly in proportion as the ratio of $W_2$ to $W_1$ is increased. It is, therefore, desirable to fix the ratio of $W_2$ to $W_1$ at such a magnitude that necessary shut down margin is secured as balanced with the degree of concentration of the fuel, the amount of burnable poison, the reactivity worth of the control rod, etc. This means that the shut down margin can be secured as desired by suitable varying the intervals between the adjacent small units 13 by relative position within the fuel assembly.

Figure 21:
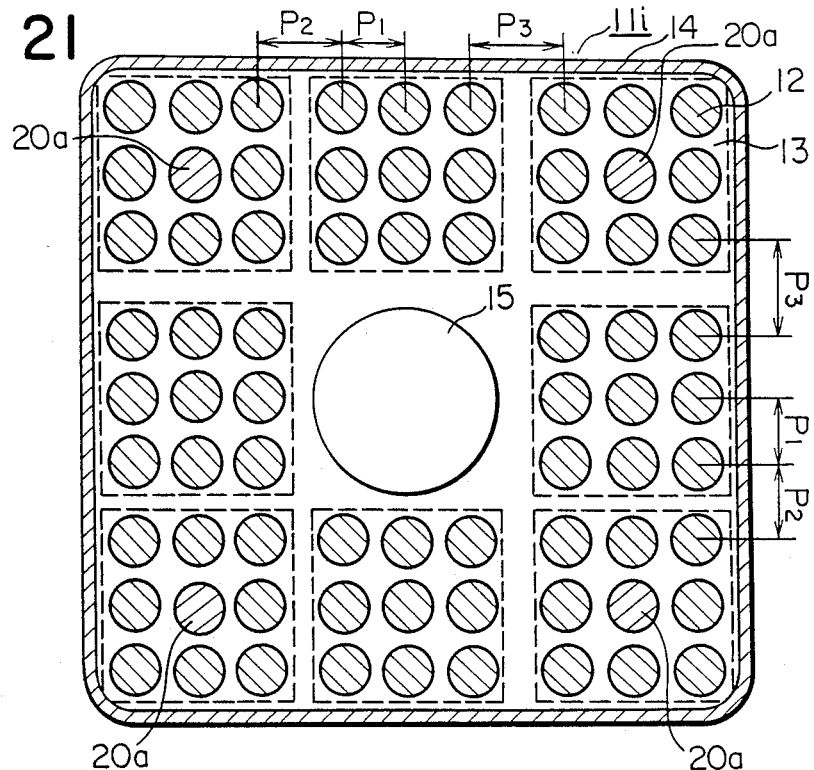
FIGS. 21 to 25 are schematic cross sections illustrating typical fuel assemblies as other embodiments of the present invention.

A fuel assembly 11i illustrated in FIG. 21 represents an embodiment wherein partial length fuel rods 20a are disposed one each at the (2, 2) positions from each of the corners of the fuel assembly 11h. Even when the intervals between the small units 13 are varied in relative position as illustrated in the diagram, the partial length fuel rods 20a disposed as described above serve the purpose of preventing the otherwise possible decline of the critical heat flux or critical power in the subchannels near the corners.

Even the fuel assembly 11h which has the intervals between the adjacent small units 13 varied by relative position within the fuel assembly can be embodied as variously modified as follows.

Figure 22:
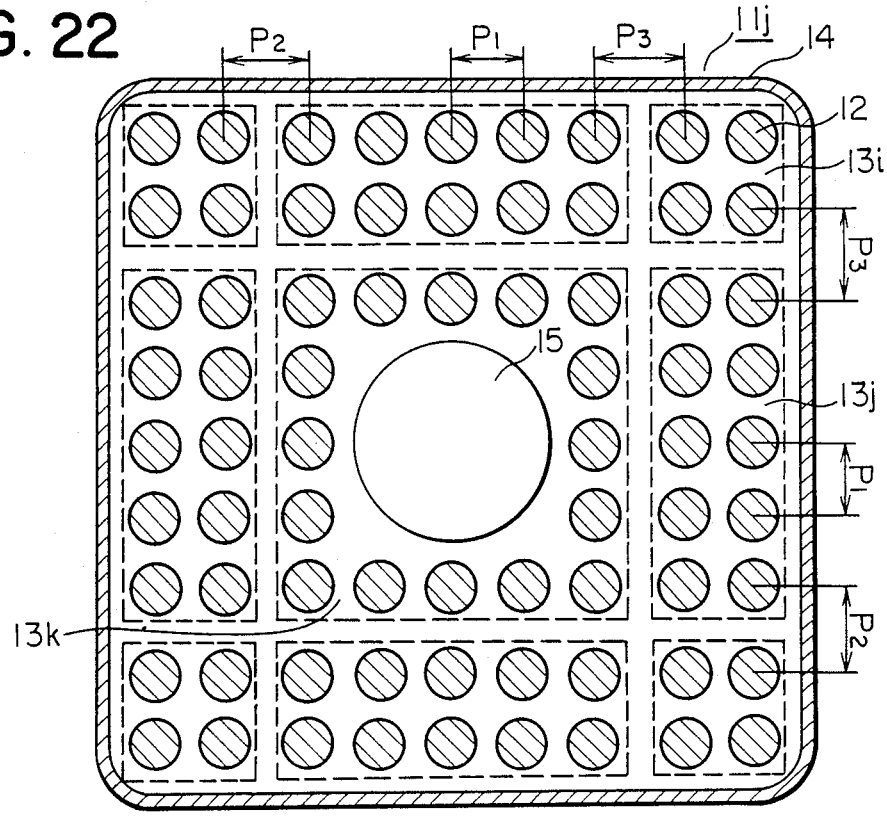

A fuel assembly 11j illustrated in FIG. 22 represents an embodiment wherein the small units 13 are varied is construction. This fuel assembly 11j comprises small units 13i composed of four fuel rods 12 and disposed one each at the four corners of the fuel assembly, small units 13j composed of 10 fuel rods 12 and disposed between the small units 13i, and a small unit 13k composed of 16 fuel rods 12 disposed around a water rod 15.

Figure 23:
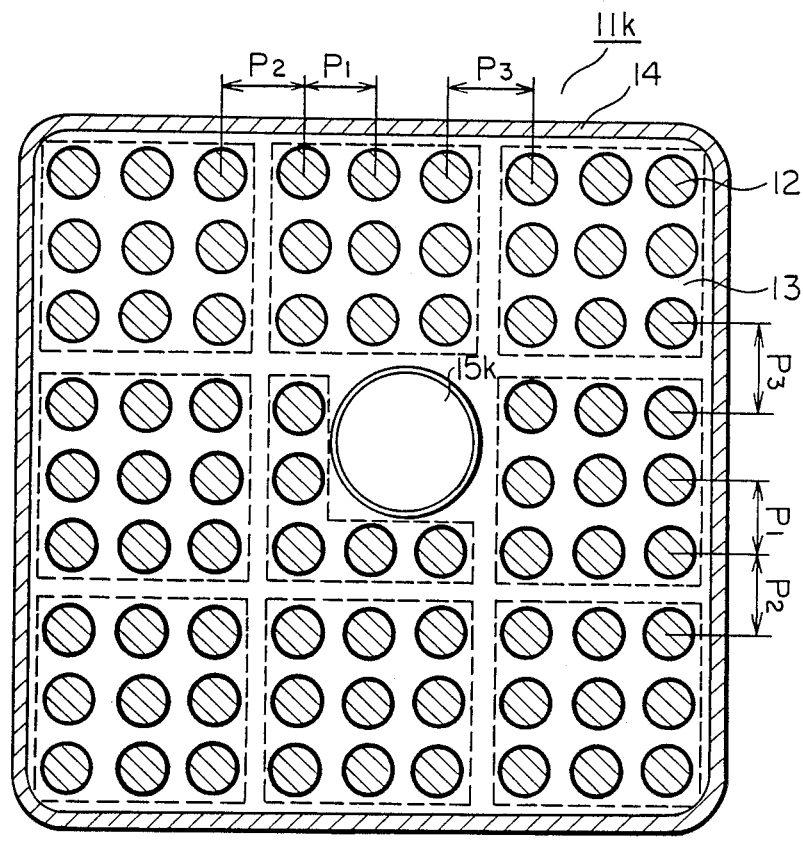

A fuel assembly 11k illustrated in FIG. 23 represents an embodiment wherein a water rod 15 possesses a varied construction. In this fuel assembly 11k, the water rod 15k has a circular cross section of a diameter equaling one side of a square containing four fuel rods 12 and therefore permits an addition to the total number of fuel rods 12 contained in the fuel assembly.

Figure 24:
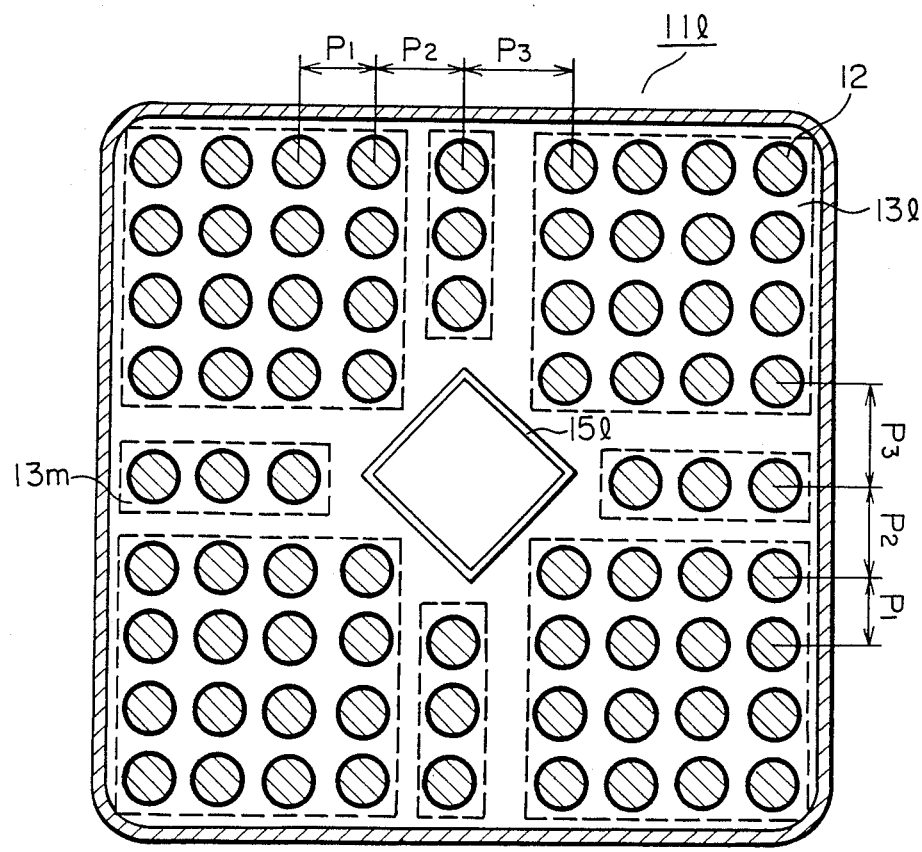

A fuel assembly 11l illustrated in FIG. 24 represents an embodiment in which small units 13 and a water rod 15 both have varied constructions. This fuel assembly 11l comprises small units 13l each composed of 16 fuel rods 12 and disposed at each of the corners of the fuel assembly, small units 13m each composed of three fuel rods 12 and disposed between the small units 13l, and a water rod 15l having a square cross section and disposed at the center of the fuel assembly.

Figure 25:
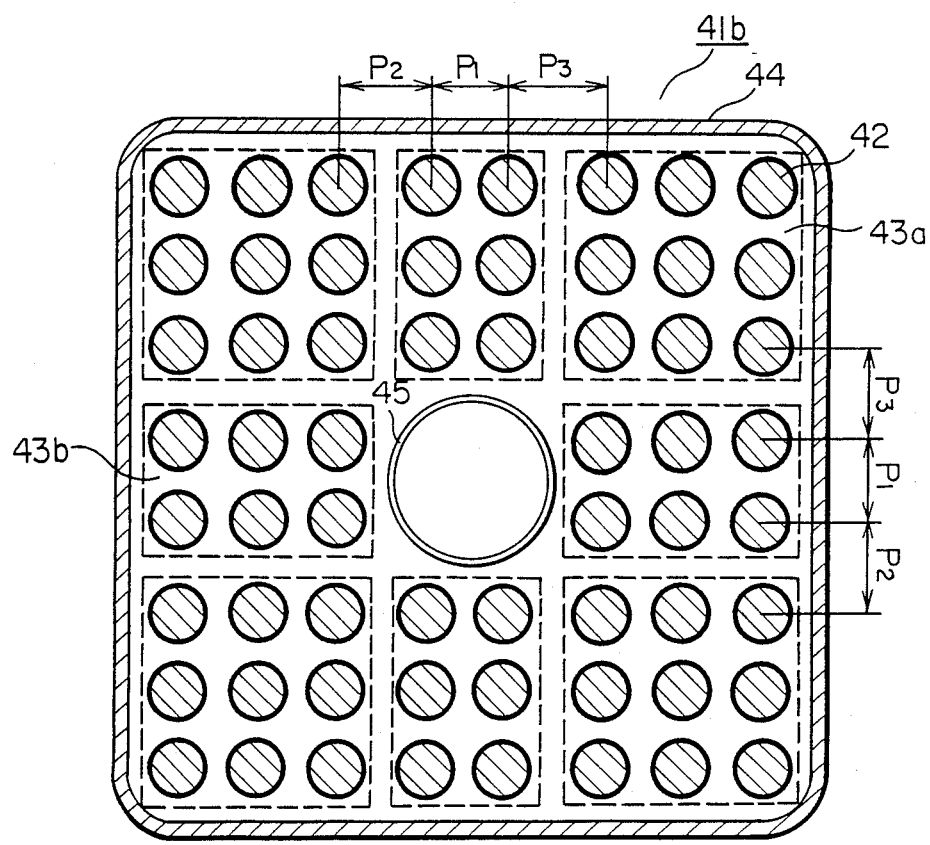
Figure 26:
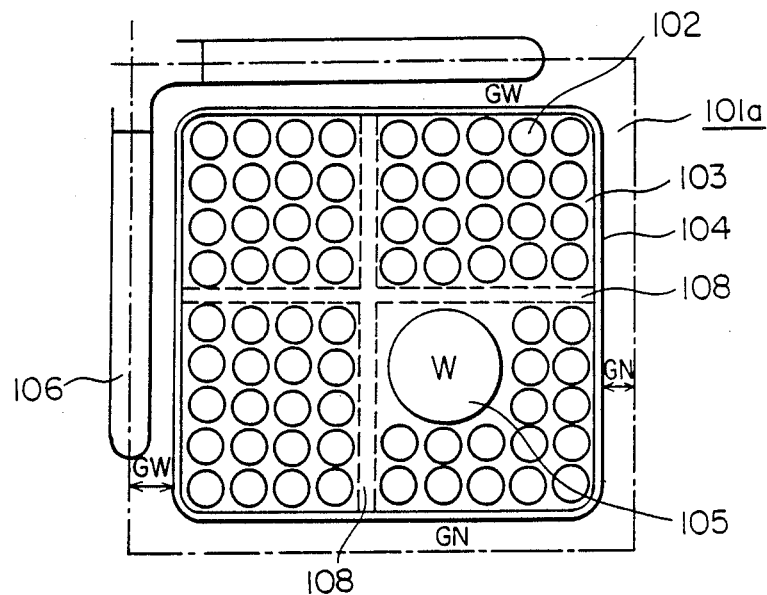
FIG. 26 is a schematic cross section illustrating a typical fuel assembly as a further embodiment of this invention.

This invention can be embodied in a construction of 8 rows and 8 columns as in a fuel assembly 41b illustrated in FIG. 25. In this fuel assembly 41b, four small units 43a composed of 9 fuel rods 42 and disposed one each in the four corners and four small units 43b composed of 6 fuel rods 42 and disposed between the small units 43a are contained within a channel box 44. A water rod 45 having a circular cross section is disposed at the center.

In the fuel assemblies 11i, 11j, 11k, 11l, and 41b described above, the component fuel rods are so spaced the intercentral distances $P_3$, $P_2$, and $P_1$ have sizes sequentially decreasing in the order mentioned.

Now, the fuel assembly to be disposed in the D-lattice core will be described.

In the D-lattice core, a wide gap (GW) having a large width for permitting insertion of a control rod 106 and a narrow gap (GN) having a small width not intended to permit insertion of a control rod are formed outside the channel box 104. The width of the wide gap is about twice that of the narrow gap. The power, therefore, issues more readily from the corner on the wide gap side than from that on the narrow gap side. The fuel rods 102 bordering on the gaps issue the power more readily than the fuel rods 102 not bordering on the gaps.

In a fuel assembly 101a, therefore, four small units 103 each formed of fuel rods 102 as described above are contained in a channel box 104 in such a manner as to give rise to a cruciform internal gap (gap for boiling water region 108 between the small units 103. A water rod (W) 105 having a large diameter equaling one side of a square of 3 rows and 3 columns is disposed as deviated from the center of the channel in the direction away from the two sides bordering on the wide gap (GW) and toward the two sides bordering on the narrow cap (GN).

Figure 27:
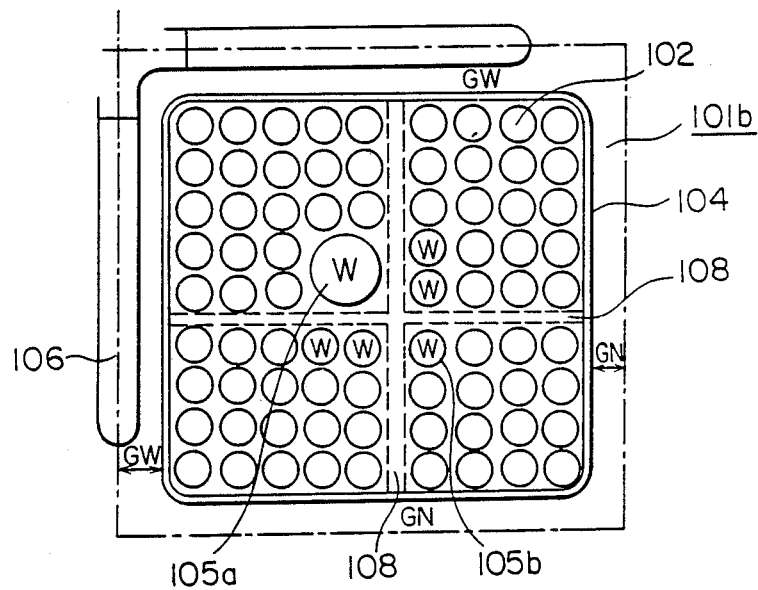
FIGS. 27 to 30 are schematic cross sections illustrating typical fuel assemblies as still other embodiments of this invention.
Figure 28:
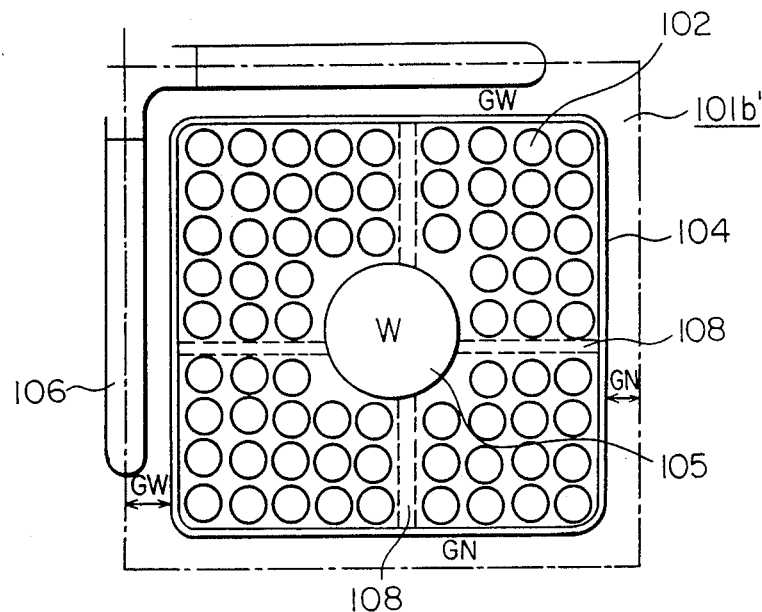

In a fuel assembly 101b illustrated in FIG. 27, a water rod (W) 105a of a medium cross section equaling one side of a square of two rows and two columns of fuel rods 102 and five water rods (W) 105b each of a diameter equaling that of one fuel rod 102 are disposed in the neighborhood of the channel and a crudiform internal gap 108 is disposed as deviated from the center of the channel in the direction away from the two sides of the channel bordering on the wide gap (GW) and toward the two sides thereof bordering on the narrow gap (GN). A fuel assembly 101b' illustrated in FIG. 28 represents an embodiment resembling the fuel assembly 101b of FIG. 27, excepting one water rod (W) 105 of a large diameter is used in the place of the water rod(W) 105a of a medium diameter and the total of 5 water rods (W) 105b having a small diameter.

Figure 29:
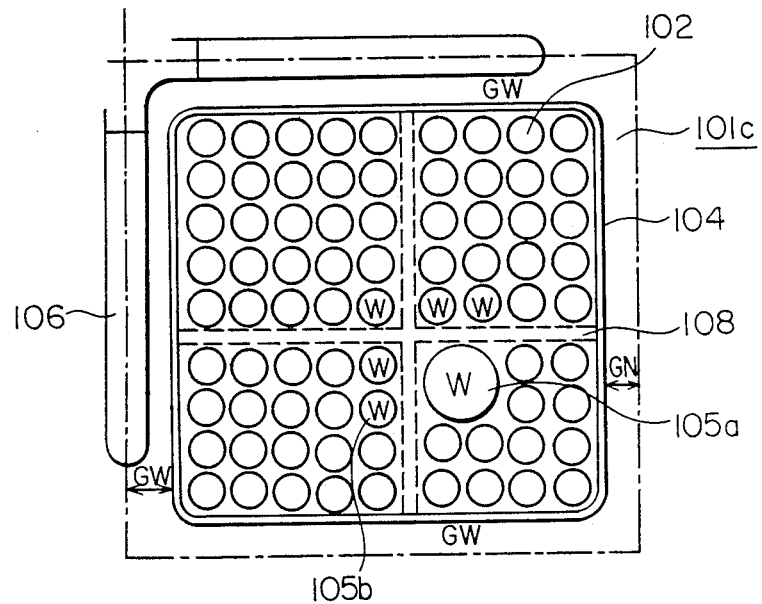
Figure 30:
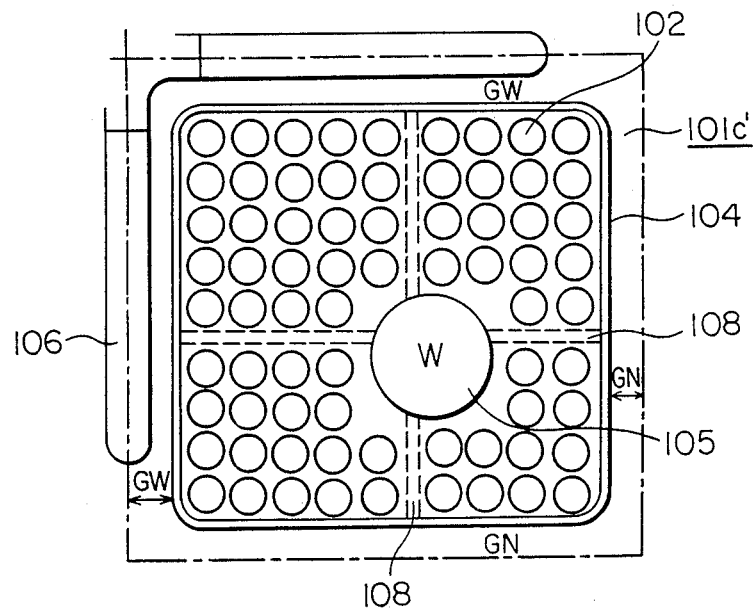

A fuel assembly 101c illustrated in FIG. 29 represents an embodiment wherein one water rod (W) 105a of a medium diameter, 5 water rods (W) 105b of a small diameter, and one cruciform internal gap 108 are disposed as deviated in the direction of the two sides bordering on the narrow gap (GN). A fuel assembly 101c' illustrated in FIG. 30 represents an embodiment resembling the fuel assembly 101c of FIG. 29, excepting one water rod (W) 105 of a large diameter is used in the place of the water rod (W) 105a of a medium diameter and 5 water rods (W) 105b of a small diameter.

In the fuel assemblies 101a, 101b, 101b', 101c and 101c' of the embodiments constructed as described above, internal gaps and water rods (W) are disposed invariably inside channel boxes 104. By deviating the positions for the internal gaps 108 and the water rods (W) toward the narrow gaps (GN) side and consequently causing the distribution of the mederators within the channel box 104 to be deviated toward the narrow gap (GN) side as described above, the disadvantage of the D-lattice core that the power from the fuel rods 102 on the wide gap (GW) side tends to increase as compared to that form the fuel rods 102 on the narrow gap (GN) side can be cancelled.

Figure 31:
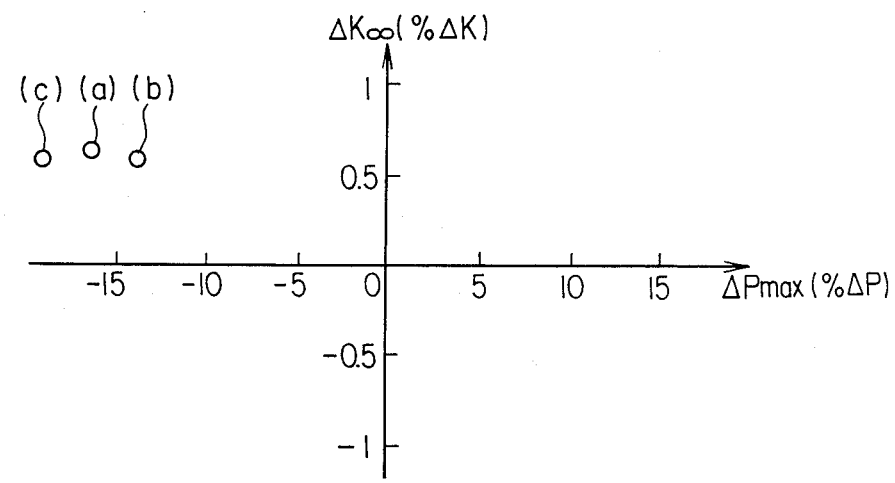
FIG. 31 is a graph showing difference in reactivity and local power peaking between the fuel assemblies of FIG. 26, FIG. 27, and FIG. 29 and the conventional fuel assembly.

The graph of FIG. 31 compares the conventional fuel assembly and the fuel assembly of the present embodiment in terms of reactivity and local power peaking on the condition that the void fraction is set at 40%, the atomic number ratio of water to-fuel in the fuel assembly at a fixed level (4.7), the average enrichment of fuel at a fixed level (4.5%), and the enrichment of the fuel rods except for those disposed in the corners (the fuel rods in the corners have a slightly lower enrichment than the average) at a fixed level. In the graph, the longitudinal axis is the scale of the difference of infinite multiplication factor based on the data obtained by the conventional fuel assembly and the horizontal axis the scale of the difference of local power peaking based on the data obtained by the conventional fuel assembly and the dots a, b, and c represent the results obtained by the fuel assemblies 101a, 101b, and 101c. It is clearly noted from this graph that the fuel assemblies 101a, 101b, and 101c possess an outstanding property of exhibiting large infinite multiplication factors in spite small local peakings.

The descriptions given so far have portrayed this invention as embodied in fuel assemblies each using 9 rows and 9 columns of fuel rods. As demonstrated hereinafter, this invention can be embodied similarly in fuel assemblies using 8 rows and 8 columns of fuel rods and producing the same effects and those of 9 rows and 9 columns of fuel rods.

Figure 32:
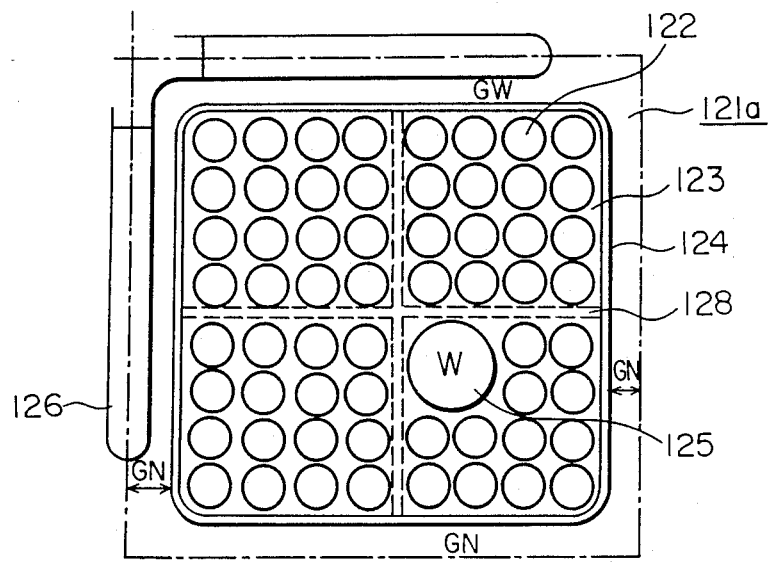
FIGS. 32 to 57 are schematic cross sections illustrating typical fuel assemblies as yet other embodiments of the present invention.

In a fuel assembly 121a illustrated in FIG. 32, similarly to the fuel assemblies cited above, four small units 123 formed of fuel rods 122 are contained within a channel box 124 in such a manner as to give rise to a cruciform internal gap 128 between the small units 123. In the small unit 123 two continuous sides of which border on the narrow gap (GN) side, a water rod (W) of a diameter equaling one side of a square containing two rows and two columns of fuel rods 122 is disposed.

Figure 33:
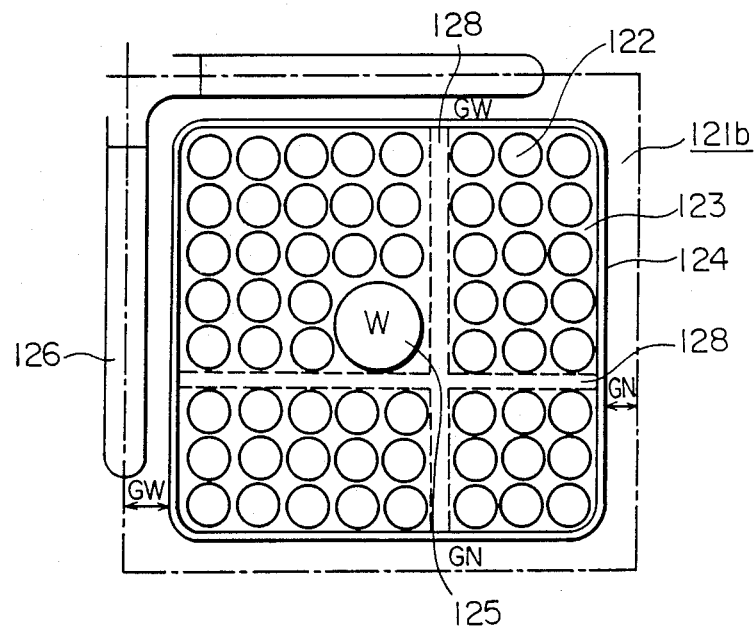

In a fuel assembly 121b illustrated in FIG. 33, a water rod (W) 125 having a diameter equaling one side of a square containing two rows and two columns of fuel rods 122 is disposed nearly at the center of the channel and a cruciform internal gap 128 is disposed as deviated from the center of the channel in the direction away from the two sides bordering on the wide gap (GW) and toward the two sides bordering on the narrow gap (GN).

Figure 34:
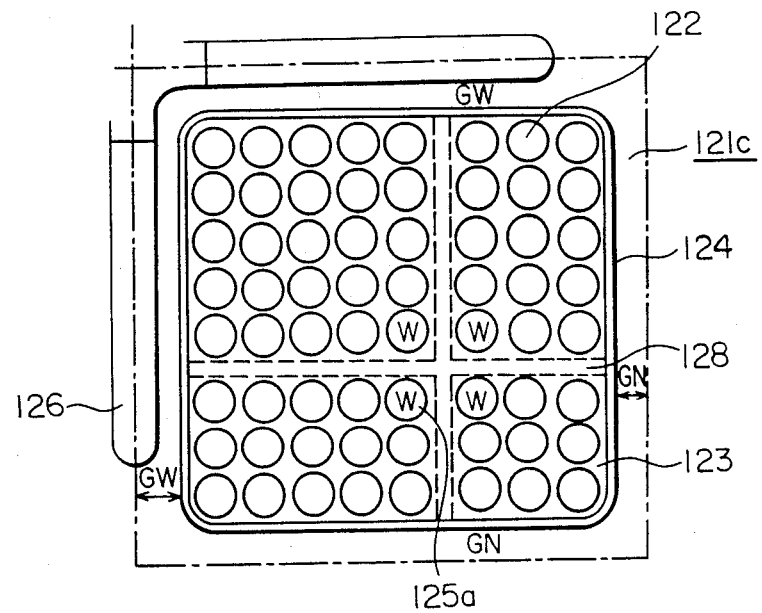
Figure 35:
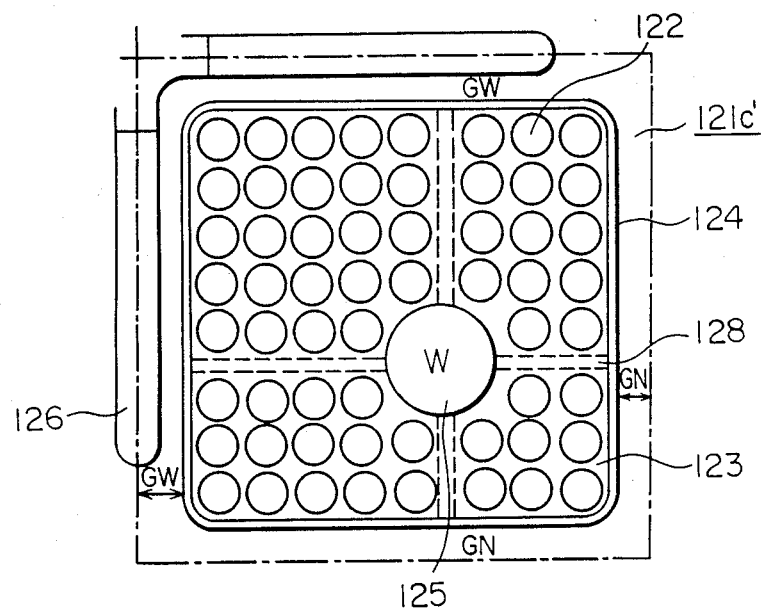

Then, in a fuel assembly 121c illustrated in FIG. 34, four water rods (W) 125a having a diameter equaling that of one fuel rod and a cruciform internal gap 128 are both disposed as deviated from the center of the channel in the direction away from the two sides bordering on the wide gap (GW) and toward the two sides bordering on the narrow gap (GN). A fuel assembly 121c' illustrated in FIG. 35 resembles the fuel assembly 121c illustrated in FIG. 34, excepting one water rod (W) 125 is used in the place of the four water rods (W) 125a.

Further, the present invention allows various alteration as follows.

Figure 36:
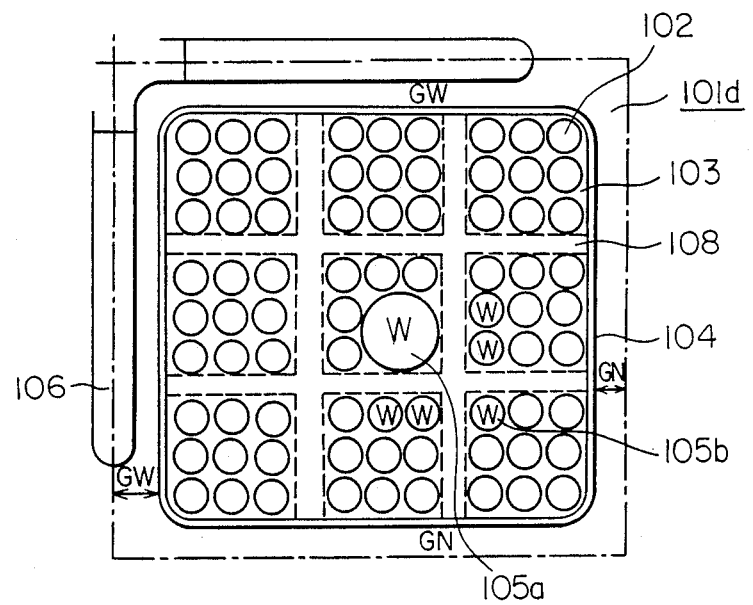
Figure 37:
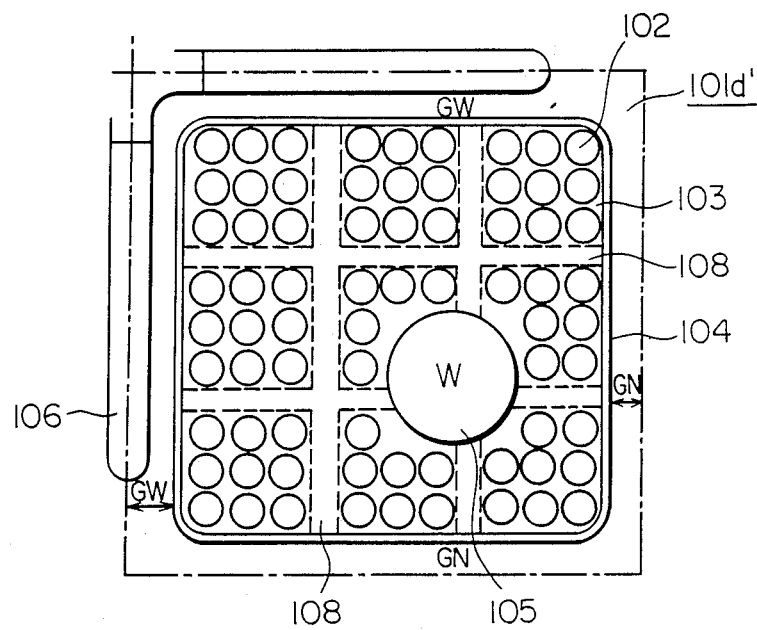

In a fuel assembly 101d illustrated in FIG. 36, similarly to the embodiments cited above, nine small units 103 formed of fuel rods 102 are contained within a channel box 104 in such a manner as to give rise to an internal gap 108 of the shape of four sides of a square each extended outwardly slightly from the corners and a water rod (W) 105a of a medium diameter equaling one side of a square contain 2 rows and 2 columns of fuel rods 102 and five water rods (W) 105b of a small diameter equaling the diameter of one fuel rod 102 are disposed as deviated from the center of the channel in the direction away from the two sides bordering on the wide gap (GW) and toward the two sides bordering on the narrow gap (GN). A fuel assembly 101d' illustrated in FIG. 37 resembles the fuel assembly 101d illustrated in FIG. 36, excepting one water rod (W) 105 of a large diameter is used in the place of the water rod (W) 105a of a medium diameter and the five water rods (W) 105b of a small diameter.

Figure 38:
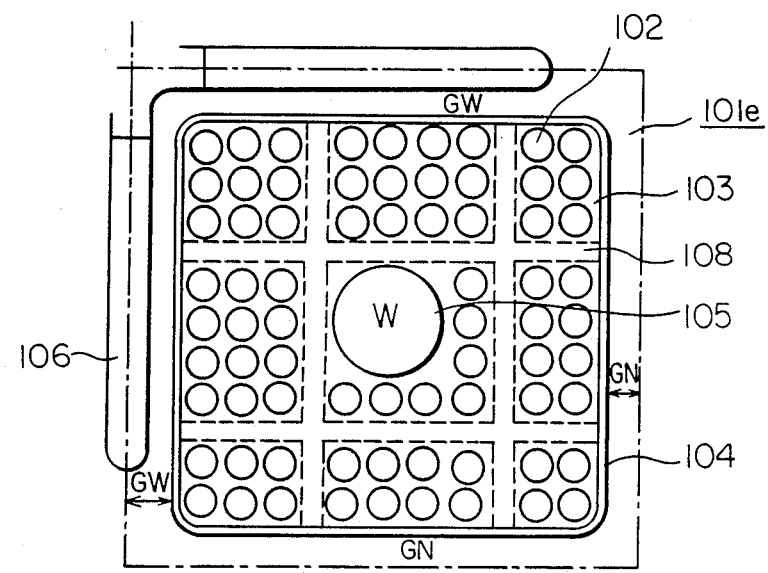

In a fuel assembly 101e illustrated in FIG. 38, a water rod (W) 105 of a large diameter is disposed nearly at the center of the channel and an internal gap 108 of the shape of four sides of a square each extended outwardly slightly from the corners is disposed as deviated from the center of the channel in the direction away from the two sides bordering on the wide gap (GW) and toward the two sides bordering on the narrow gap (GN).

Figure 39:
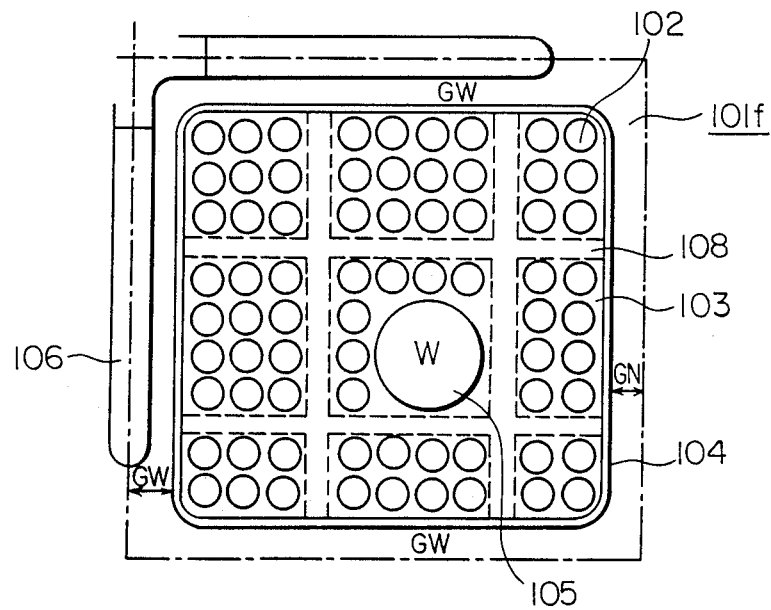

In a fuel assembly 101f illustrated in FIG. 39, a water rod (W) 105 of a large diameter and an internal gap 108 of the shape of four sides of a square each extended outwardly slightly from the corners are both disposed as deviated from the center of the channel in the direction away from the two sides bordering on the wide gap (GW) and toward the two sides bordering on the narrow gap (GN).

Now, the present invention embodied in fuel assemblies of 8 rows and 8 columns of fuel rods and provided with an internal gap of the shape of four sides of a square each extended outwardly slightly from the corners will be cited below.

Figure 40:
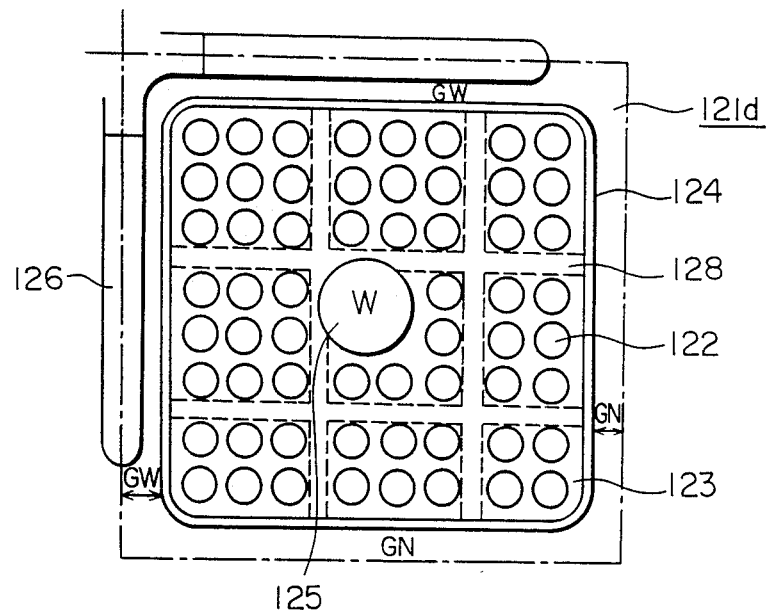

In a fuel assembly 121d illustrated in FIG. 40, nine small units 123 formed of fuel rods 122 are contained in a channel box 124 in such a manner as to give rise to an intergap 128 of the shape of four sides of a square each extended outwardly slightly from the corners. In this fuel assembly, the internal gap 128 is located as deviated from the center of the channel in the direction away from the two sides bordering the wide gap (GW) and toward the two sides bordering on the narrow gap (GN). In the central small unit 123, a water rod (W) 125 of a diameter equaling one side of a square containing 2 rows and 2 columns of fuel rods 122 is disposed.

Figure 41:
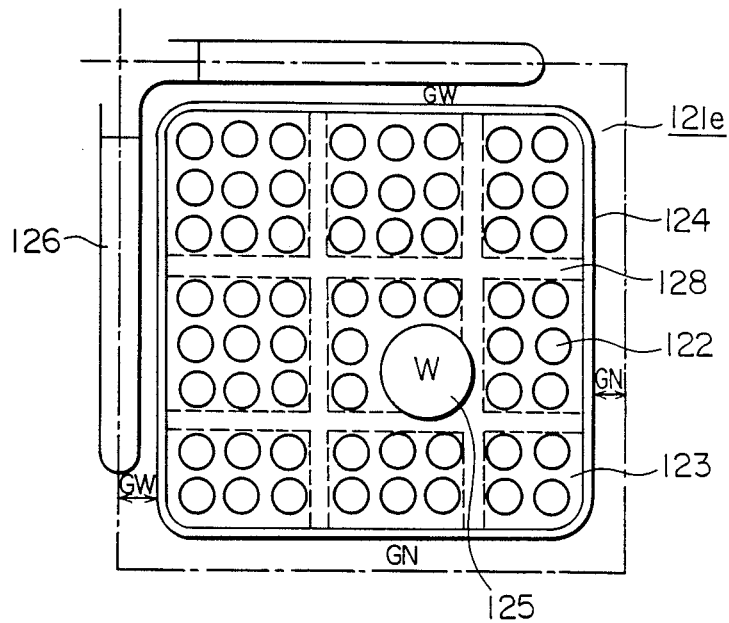
Figure 42:
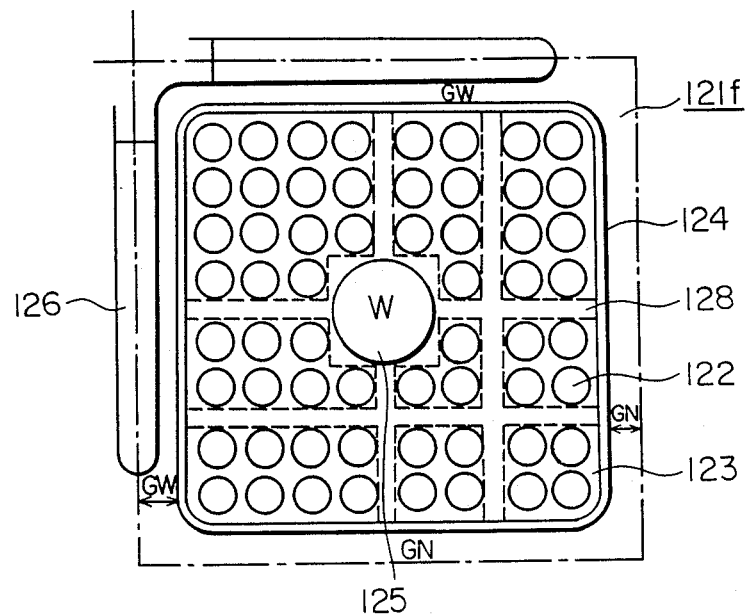
Figure 43:
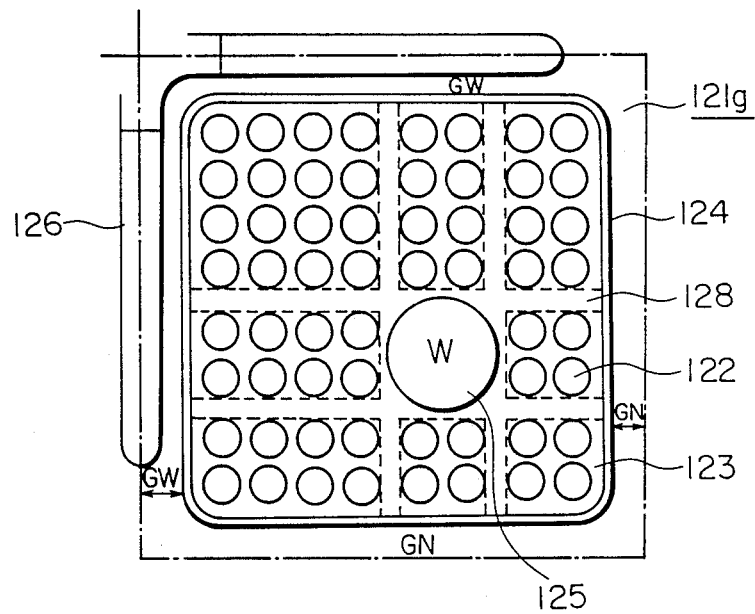
Figure 44:
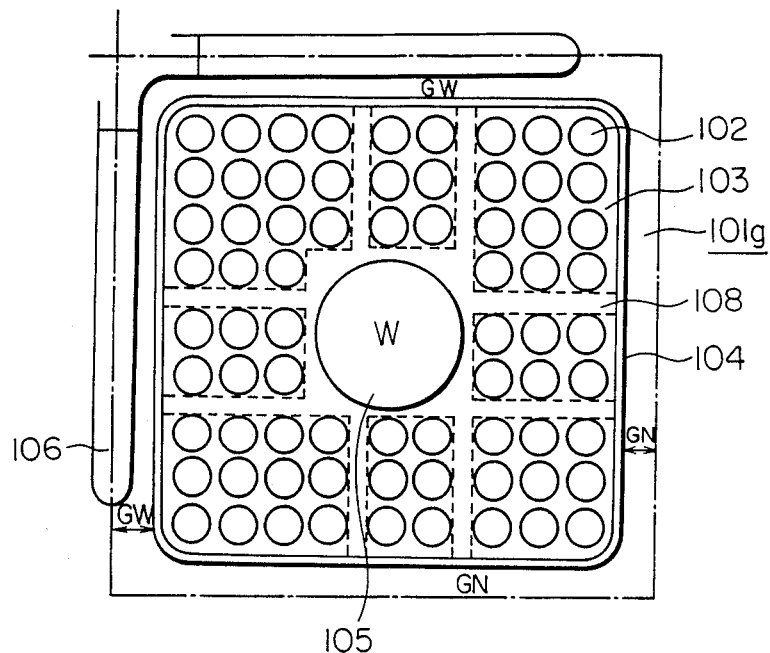

In a fuel assembly 121e illustrated in FIG. 41, a water rod (W) 125 and an internal gap 128 of the shape of four sides of a square each extended outwardly slightly from the corners are disposed as deviated from the center of the channel in the direction away from the two sides bordering on the wide gap (GW) and toward the two sides bordering on the narrow gap (GN).

Fuel assembies 101g to 101k illustrated in FIGS. 44 to 48 represent embodiments wherein internal gaps 108 each of the shape of four sides of a square each extended outwardly slightly from the corners formed in fuel assemblies of 9 rows and 9 columns of fuel rods were altered in shape.

Figure 45:
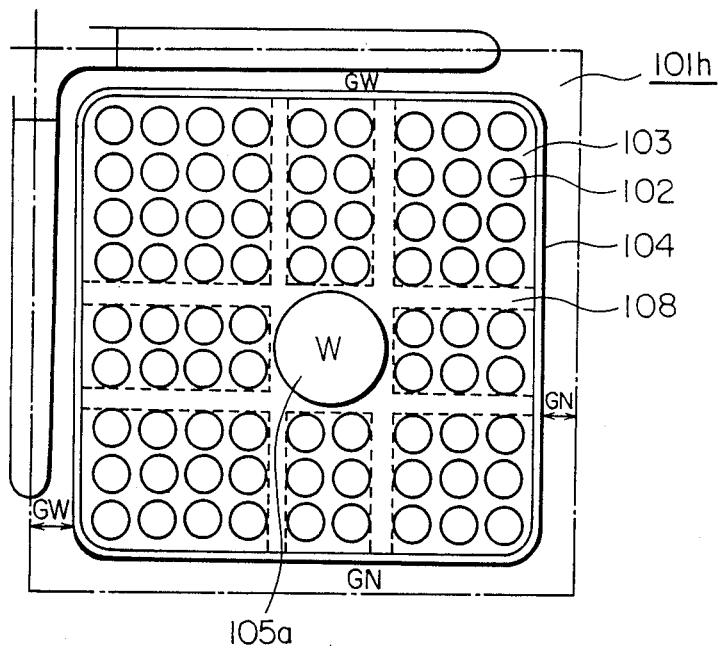

A fuel assembly 101g illustrated in FIG. 45 represent embodiments wherein internal gaps 108 are formed each by the 4-2-3 arrangement of fuel rods 102 and are disposed as deviated from the center of the channel in the direction away from the two sides bordering on the wide gap (GW) and toward the two sides bordering on the narrow gap (GN). In the fuel assembly 101g, a water rod (W) 105 of a large diameter equaling one side of a square containing 3 rows and 3 columns of fuel rods 102 is disposed near the center of the channel. In the fuel assembly 101h, a water rod (W) 105a of a medium diameter equaling one side of a square containing 2 rows and 2 columns of fuel rods 102 is disposed as deviated from the center of the channel in the direction away from the two sides bordering on the wide gap (GW) and toward the two sides bordering on the narrow gap (GN).

Figure 46:
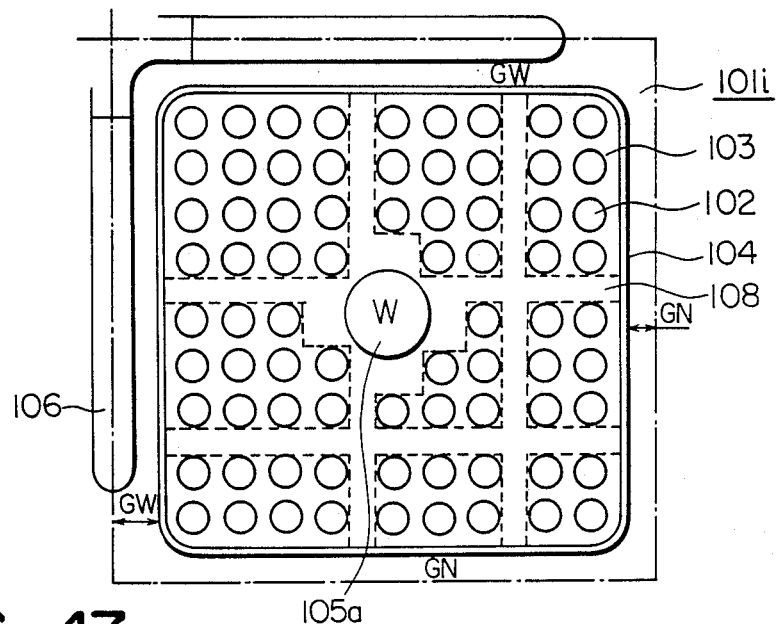
Figure 47:
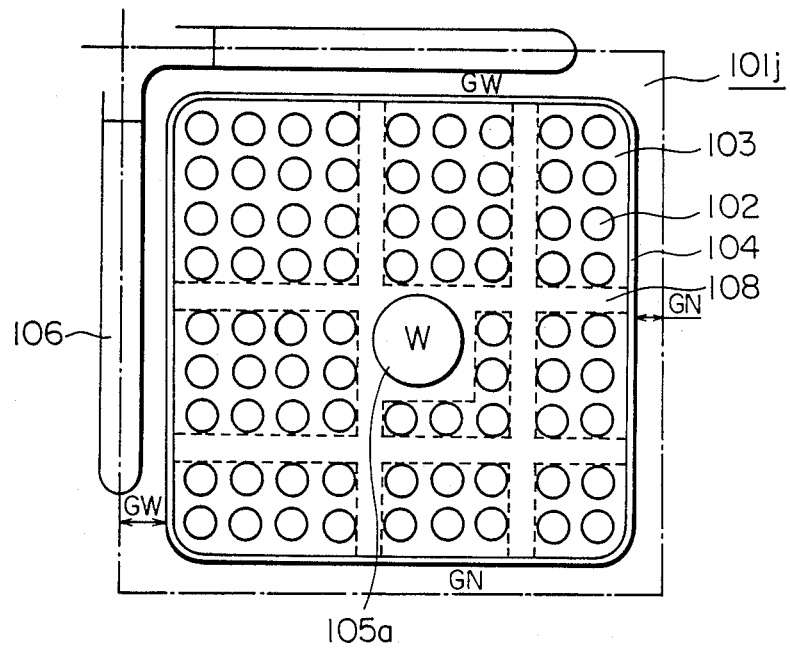
Figure 48:
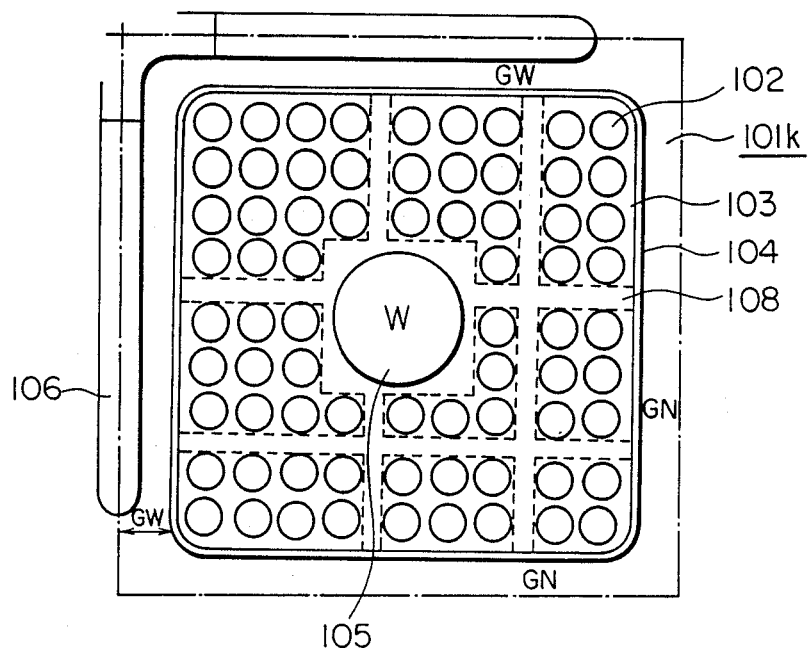

A fuel assembly 101i illustrated in FIG. 46, a fuel assembly 101j illustrated in FIG. 47, and a fuel assembly 101k illustrated in FIG. 48 are embodiments wherein internal gaps 108 each formed by the 4-3-2 arrangement of fuel rods 102 are each disposed as deviated from the center of the channel in the direction away from the two sides bordering on the wide gap (GW) and toward the two sides bordering on the narrow gap (GN). In the fuel assembly 101i, a water rod (W) 105a of a medium diameter equaling one side of a square containing 2 rows and 2 columns of fuel rods 102 is disposed near the center of the channel. In the fuel assembly 101j, a water rod (W) 105a of a medium diameter is disposed as deviated from the center of the channel in the direction away from the two sides bordering on the wide gap (GW) and toward the two sides bordering on the narrow gap (GN). In the fuel assembly 101k, a water rod (W) 105 of a large diameter equaling one side of a square containing 3 rows and 3 columns of fuel rods 102 is disposed near the center of the channel.

Figure 49:
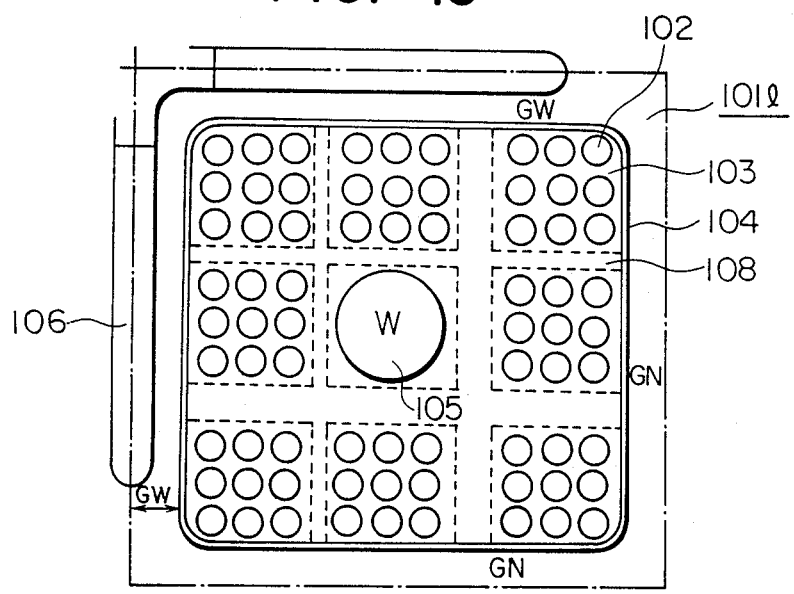
Figure 50:
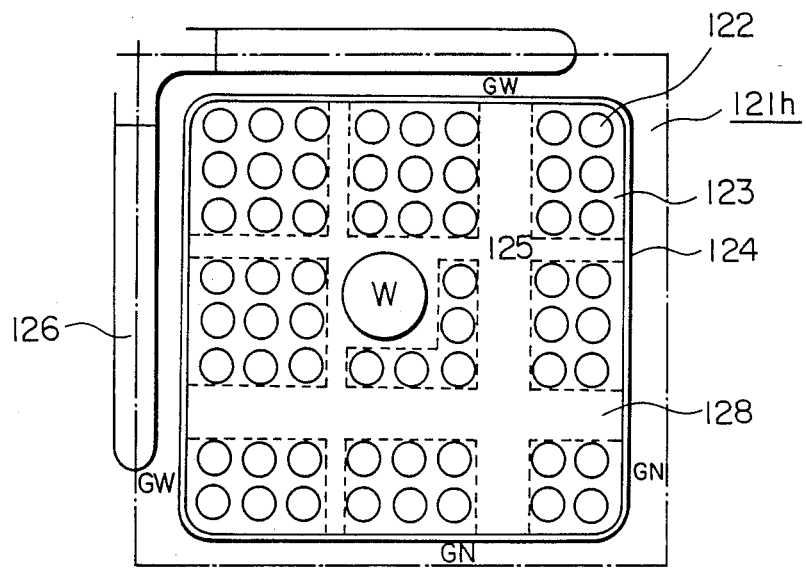
Figure 51:
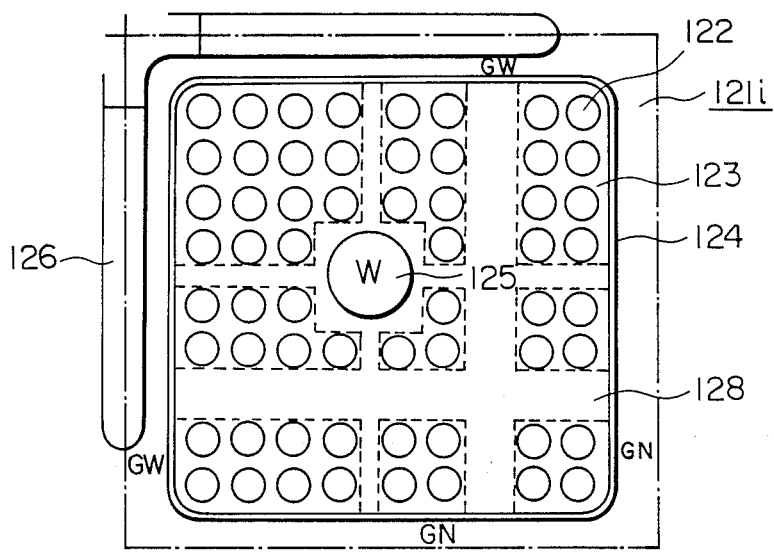
Figure 52:
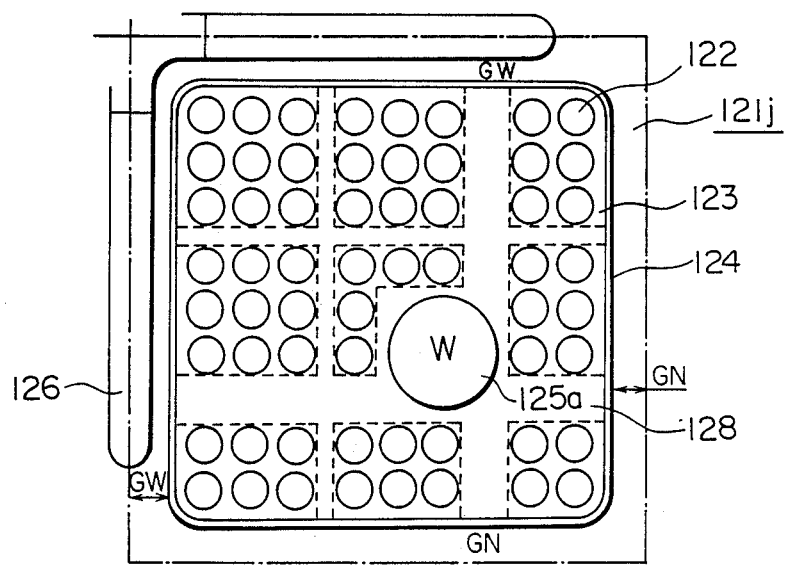
Figure 53:
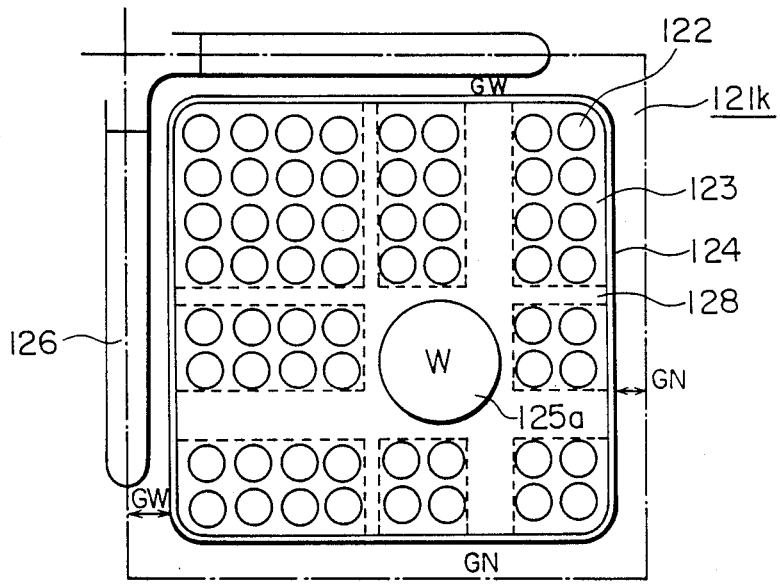

Then a fuel assembly 101l illustrated in FIG. 49 is composed of 9 rows and 9 columns of fuel rods. In this fuel assembly 101, an internal gap 108 of the shape of four sides of a square each extended outwardly slightly from the corners is so formed that the narrow gap (GN) side gaps are larger than the wide gap (GW) side gaps. By giving a larger width to the narrow gap (GN) side gaps of the internal gap 108 than to the wide gap (GW) side gaps thereof as described above, the disadvantage of the D-lattice reactor that the power issues more readily from the wide gap (GW) side than from the narrow gap side (GN) can be cancelled. The fuel assembly of this embodiment permits a decrease in the difference of reactivity during the course of power operation and during the period of cold state and secures shut down margin easily as compared with the fuel assembly incorporating therein an internal gap of a fixed width.

Fuel assemblies 121h to 121k illustrated respectively in FIGS. 50 to 54 are each formed of 8 rows and 8 columns of fuel rods. They represent embodiments wherein internal gaps are so formed that the narrow gap (NG) side gaps have a larger width than the wide gap (GW) side taps. In each of the fuel assembly 121h and the fuel assembly 121i, a water rod (W) 125 of a diameter equaling one side of a square containing 2 rows and 2 column of fuel rods 122 is disposed as slightly deviated from the center of the channel toward the wide gap (GW) side. In each of the fuel assembly 121j and the fuel assembly 121k, a water rod (W) 125a of a large diameter equaling one side of a square containing 3 rows and 3 columns of fuel rods 122 is disposed as deviated from the center of the channel toward the narrow gas (GN) side.

Figure 54:
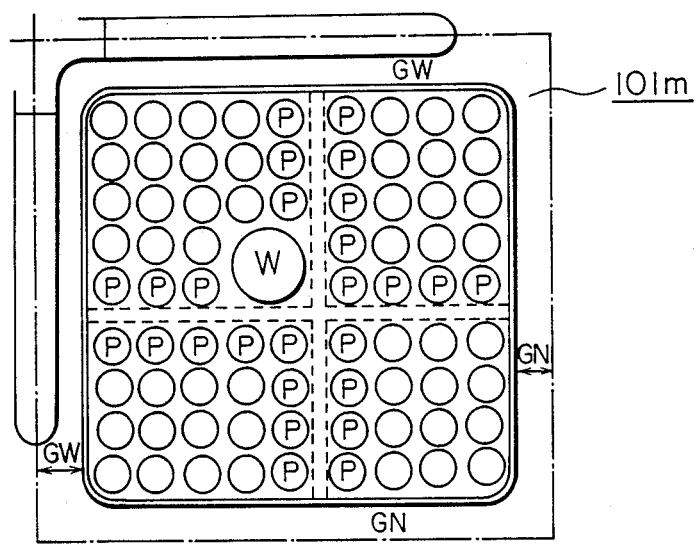
Figure 55:
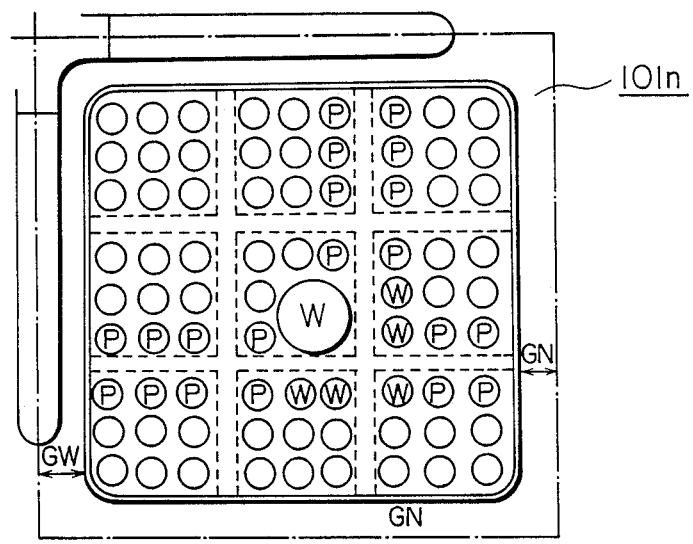
Figure 56:
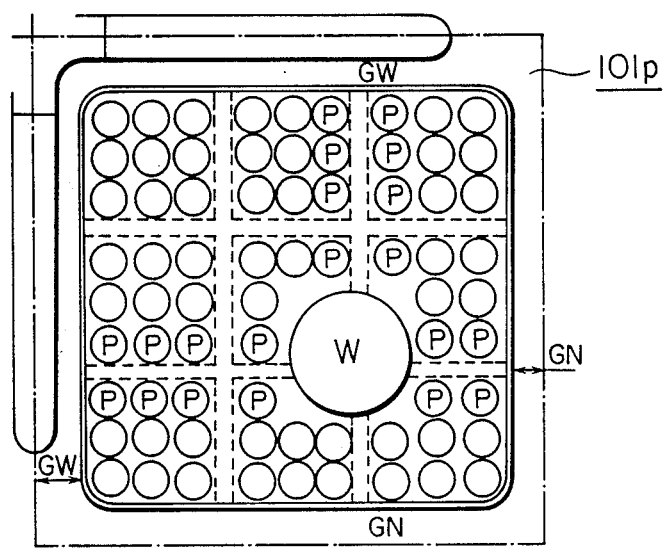
Figure 57:
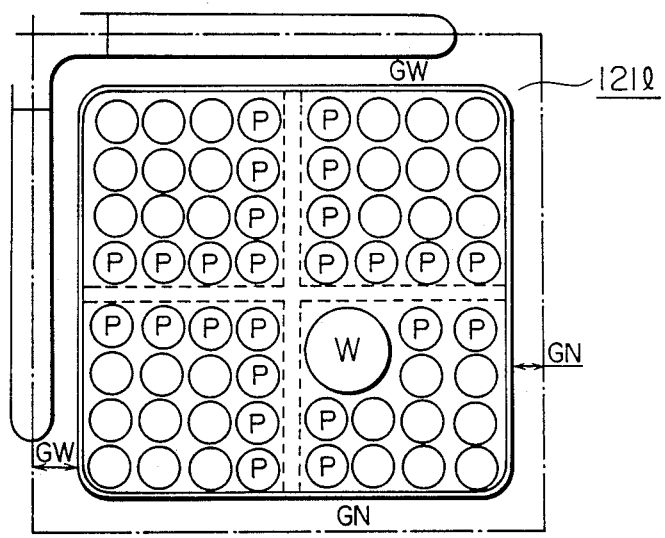

A fuel assembly 101m illustrated in FIG. 54, a fuel assembly 101n illustrated in FIG. 55, and a fuel assembly 101p illustrated in FIG. 56 are each composed of 9 rows and 9 columns of fuel rods. They each represent an embodiment wherein partial length fuel rods (P) having shortened upper portions are closely juxtaposed to an internal gap 108. A fuel assembly 121l illustrated in FIG. 57 is composed of 8 rows and 8 columns of fuel rods. It represents an embodiment wherein partial length fuel rods (P) having a shortened upper portion are closely juxtaposed to an internal gap 128.

These fuel assemblies 101m, 101n, 101p, and 121l permit a decrease in the difference of reactivity during the course of power operation and during the period of cold state because the amount of the water surrounding the internal gaps 108 and 128 increase in the part above the upper ends of the partial length fuel rods (P) during the period of cold state. From the standpoint of securing shut down margin, it is important that the upper part of the fuel assembly which has a high thermal neutron flux during the period of cold state should exhibit a small difference of reactivity during the course of output operation and during the period of cold state. From the standpoint of ensuring economy of the fuel, it is desirable that the uranium inventory should be large. Thus, the part below the fuel rods should be filled with uranium. From the standpoint of ensuring the stability of the core, since the pressure loss in the upper part of the fuel assembly destined to constitute a high void region is desired to be as small as possible, it is important that the partial length fuel rods (P) disposed around the internal gaps 108, 128 should allow a decrease in the pressure loss in the upper part of the fuel assembly.

What is claimed is:

1. A fuel assembly having a plurality of cylindrical fuel rods having a plurality of fuel pellets sealed therein and a channel box for holding said cylindrical fuel rods in a regularly bundled pattern, comprising;

a plurality of small units each having a predetermined number of said fuel rods bundled as spaced with a fixed intercentral distance and being arranged in such a manner that the intercentral distance between the component fuel rods falling on the mutually juxtaposed sides of the adjacent small units is larger than the intercentral distance between the adjacent fuel rods in the same units; and at least one water rod disposed near the center of a cluster of said plurality of units.

2. The fuel assembly of claim 1, wherein at least one of the fuel rods located near each of the peripheral corners is a partial length fuel rod.

3. The fuel assembly of claim 1, wherein the intercentral distance between the fuel rods belonging one each to two adjacent small units is varied by the combination of small units.

4. A fuel assembly intended for incorporation in a D-lattice core having a plurality of cylindrical fuel rods with a plurality of fuel pellets sealed therein and a channel box containing said cylindrical fuel rods in a regularly bundled pattern, comprising:

a plurality of small units each having a predetermined number of fuel rods bundled as spaced with a fixed intercentral distance and being arranged in such a manner that the intercentral distance between the component fuel rods falling on the mutually juxtaposed sides of the adjacent small units is larger than the intercentral distance between the adjacent fuel rods in the same units;

at least one water rod disposed among said plurality of small units; and at least either of an internal gap formed consequently among said small units and said water rod allowed to be disposed as deviated from the center of an in-channel toward a narrow gap side.

5. The fuel assembly of claim 4, wherein said internal gap is in the shape of four sides of a square each extended outwardly slightly from the corners of said square and a greater width is given to the narrow gap side gaps then to the wide gap side gaps of said internal gap.

* * * * *

UNITED STATES PATENT AND TRADEMARK OFFICE
CERTIFICATE OF CORRECTION

PATENT NO. : 4,863,680
DATED : September 05, 1989
INVENTOR(S) : Koichi Sakurada et al.

It is certified that error appears in the above-identified patent and that said Letters Patent is hereby corrected as shown below:

Claim 5, Column 16, Line 35, change "then" to --than--.

Signed and Sealed this

Third Day of November, 1992

*Attest:*

DOUGLAS B. COMER

*Attesting Officer*      *Acting Commissioner of Patents and Trademarks*